(12) United States Patent
Lai

(10) Patent No.: US 10,890,699 B2
(45) Date of Patent: Jan. 12, 2021

(54) OPTICAL IMAGE LENS ASSEMBLY, IMAGE CAPTURING APPARATUS AND ELECTRONIC DEVICE

(71) Applicant: LARGAN PRECISION CO., LTD., Taichung (TW)

(72) Inventor: Mei-Hui Lai, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 517 days.

(21) Appl. No.: 15/694,901

(22) Filed: Sep. 4, 2017

(65) Prior Publication Data

US 2018/0067242 A1    Mar. 8, 2018

(30) Foreign Application Priority Data

Sep. 7, 2016   (TW) .............................. 105128965 A
Aug. 16, 2017   (TW) .............................. 106127818 A

(51) Int. Cl.
| | |
|---|---|
| G02B 5/20 | (2006.01) |
| G02B 5/22 | (2006.01) |
| G02B 1/04 | (2006.01) |
| G02B 9/04 | (2006.01) |
| G02B 9/34 | (2006.01) |
| G02B 13/00 | (2006.01) |

(52) U.S. Cl.
CPC ............. *G02B 5/208* (2013.01); *G02B 1/041* (2013.01); *G02B 5/223* (2013.01); *G02B 9/04* (2013.01); *G02B 9/34* (2013.01); *G02B 13/004* (2013.01); *G02B 13/0045* (2013.01); *G02B 13/0035* (2013.01)

(58) Field of Classification Search
CPC .. G02B 1/041; G02B 13/004; G02B 13/0045; G02B 5/208; G02B 5/223; G02B 9/04; G02B 9/34; G02B 13/0035; G02B 1/04; G02B 5/20; G02B 5/22; C08L 69/00
See application file for complete search history.

(56) References Cited

U.S. PATENT DOCUMENTS

| | | | | |
|---|---|---|---|---|
| 5,309,283 A * | 5/1994 | Kreitzer | ................... | H04N 9/31 348/781 |
| 5,969,878 A * | 10/1999 | Koizumi | .............. | G02B 15/177 359/681 |
| 6,011,648 A * | 1/2000 | Mukai | .................. | G02B 15/177 359/362 |
| 6,187,844 B1 * | 2/2001 | Murata | .............. | C08G 18/3876 524/196 |

(Continued)

FOREIGN PATENT DOCUMENTS

| | | |
|---|---|---|
| JP | 2005202056 A | 7/2005 |
| JP | 2014066918 A | 4/2014 |

(Continued)

*Primary Examiner* — Balram T Parbadia
(74) *Attorney, Agent, or Firm* — McClure, Qualey & Rodack, LLP

(57) ABSTRACT

An optical image lens assembly includes, from an object side to an image side, at least one optical lens element. The optical lens element is made of plastic material and includes a long wavelength light absorbing agent. The long wavelength light absorbing agent is uniformly mixed with the plastic material, wherein the optical lens element has refractive power, and at least one of the object-side surface and the image-side surface thereof is aspheric.

26 Claims, 21 Drawing Sheets

(56) References Cited

U.S. PATENT DOCUMENTS

| | | | |
|---|---|---|---|
| 6,671,103 B2* | 12/2003 | Itoh | G02B 15/177 359/676 |
| 7,457,044 B2* | 11/2008 | Ohzawa | G02B 13/06 359/668 |
| 8,773,782 B2 | 7/2014 | Chou et al. | |
| 8,797,659 B2* | 8/2014 | Souma | G02B 13/24 359/750 |
| 9,348,117 B1 | 5/2016 | Chang et al. | |
| 2005/0041281 A1* | 2/2005 | Aoyama | G02B 1/10 359/356 |
| 2005/0046967 A1* | 3/2005 | Kosaka | G02B 1/041 359/722 |
| 2007/0171534 A1 | 7/2007 | Chien | |
| 2008/0137030 A1* | 6/2008 | Hoffman | G02C 7/04 351/159.24 |
| 2010/0118263 A1 | 5/2010 | Tamura et al. | |
| 2011/0069378 A1 | 3/2011 | Lin et al. | |
| 2011/0128494 A1* | 6/2011 | Takahashi | C08K 5/13 351/159.63 |
| 2012/0243077 A1* | 9/2012 | Osawa | G02B 3/0056 359/356 |
| 2012/0261550 A1* | 10/2012 | Chou | G02B 9/34 250/208.1 |
| 2013/0279026 A1* | 10/2013 | Asami | G02B 13/06 359/740 |
| 2013/0301136 A1* | 11/2013 | Lin | G02B 13/0035 359/601 |
| 2014/0002715 A1* | 1/2014 | Wang | G02B 15/177 348/345 |
| 2014/0016188 A1 | 1/2014 | Liu | |
| 2014/0043694 A1* | 2/2014 | Tsai | G02B 9/64 359/708 |
| 2014/0198392 A1* | 7/2014 | Han | G02B 15/177 359/680 |
| 2014/0211009 A1* | 7/2014 | Fursich | G02B 13/04 348/148 |
| 2015/0277001 A1* | 10/2015 | Kuriyama | H01L 27/14625 250/208.1 |
| 2015/0370094 A1* | 12/2015 | Hashimoto | G02B 5/208 351/159.62 |
| 2016/0004046 A1* | 1/2016 | Asami | G02B 13/04 359/713 |
| 2016/0319069 A1* | 11/2016 | Shigematsu | C08G 64/06 |
| 2016/0349420 A1 | 12/2016 | Chang et al. | |

FOREIGN PATENT DOCUMENTS

| | | |
|---|---|---|
| TW | 201241471 A | 10/2012 |
| TW | 201423143 A | 6/2014 |
| WO | 2012060449 A1 | 5/2012 |
| WO | 2015111316 A1 | 7/2015 |
| WO | 2016114362 A1 | 7/2016 |

* cited by examiner

OPTICAL IMAGE LENS ASSEMBLY, IMAGE CAPTURING APPARATUS AND ELECTRONIC DEVICE

RELATED APPLICATIONS

This application claims priority to Taiwan Application Serial Number 105128965, filed Sep. 7, 2016 and Taiwan Application Serial Number 106127818, filed Aug. 16, 2017, which are herein incorporated by reference.

BACKGROUND

Technical Field

The present disclosure relates to an optical image lens assembly and an image capturing apparatus. More particularly, the present disclosure relates to a compact optical image lens assembly and an image capturing apparatus which can absorb long-wavelength lights and are applicable to electronic devices.

Description of Related Art

Mobile products conventionally adopt an image sensor for capturing lights so as to form an image. The most common image sensor is a CCD (Charge-Coupled Device) or a CMOS (Complementary Metal-Oxide-Semiconductor) sensor. However, the image sensor not only receives and responds to visible lights but also responds to infrared lights which is invisible for human eyes. If the infrared lights are not filtered when photographing, the color of the image will be distorted. Accordingly, the image cannot truly reflect the scene seen by human eyes.

For solving the aforementioned problem, an IR-cut filter is disposed between a last lens element of an optical system and the image sensor. However, the IR-cut filter has a certain thickness, which is unfavorable for reducing the volume of the optical system and is unfavorable for reducing the number of optical elements used in the optical system. Accordingly, the optical system is unfavorable to be applied to compact mobile products.

For enhancing the filtration effect for the infrared lights, blue glass filters are provided. However, the blue glass filters filter the infrared lights by absorbing the infrared lights, which requires a sufficient thickness for effectively absorbing the infrared lights. Accordingly, the back focal length of the optical system is increased, which is unfavorable for maintaining the compact size of the optical system.

Moreover, with the enhanced standard for the specifications of the optical systems of the mobile products, the demand for a mobile product with smaller size and better image quality is increased. For enhancing the image quality, a larger number of the lens elements are required for correcting aberrations. Therefore, an optical system with at least five-element lens structure has become the mainstream. The optical system can provide high image quality. However, the volume of the optical system cannot be reduced easily due to the large number of lens elements. Also, with the large number of lens elements, the optical system has the drawback of protruding from the surface of the mobile product, which is unfavorable for featuring the mobile product with a thin thickness and an aesthetic design, thereby the importance of reducing the number of the optical elements used in the optical system is highlighted.

Therefore, how to improve the technology for filtering infrared lights, which can effectively filter the infrared lights so as to prevent the color distortion, can maintain the compact size for satisfying the demand of thin mobile products, and can reduce the number of the optical elements so as to be favorably configured as a multi-lens structure for satisfying the demand of high image quality, has become the goal of relevant industry.

SUMMARY

According to one aspect of the present disclosure, an optical image lens assembly includes, in order from an object side to an image side, at least one optical lens element made of a plastic material includes at least one long-wavelength light absorbing agent, and the long-wavelength light absorbing agent is homogeneously mixed with the plastic material, wherein the optical lens element including the long-wavelength light absorbing agent has refractive power, and at least one of the object-side surface and the image-side surface of the optical lens element is aspheric. When an average transmittance in a wavelength range of 650 nm-700 nm of the optical lens element including the long-wavelength light absorbing agent is T6570, and an average transmittance in a wavelength range of 400 nm-650 nm of the optical lens element including the long-wavelength light absorbing agent is T4065, the following conditions are satisfied:

$T6570 \leq 50\%$; and
$50\% \leq T4065$.

According to another aspect of the present disclosure, an image capturing apparatus includes the optical image lens assembly according to the aforementioned aspect and an image sensor, wherein the image sensor is disposed on an image surface of the optical image lens assembly.

According to yet another aspect of the present disclosure, an electronic device, which is a mobile photographing device, includes the image capturing apparatus according to the aforementioned aspect.

According to still another aspect of the present disclosure, an electronic device, which is a portable device, includes the image capturing apparatus according to the aforementioned aspect.

According to further another aspect of the present disclosure, a plastic material for manufacturing the optical lens element of the optical image lens assembly according to the aforementioned aspect is provided. When an average transmittance in a wavelength range of 400 nm-500 nm of the optical lens element made of the plastic material is T4050, an average transmittance in a wavelength range of 500 nm-580 nm of the optical lens element made of the plastic material is T5058, and an average transmittance in a wavelength range of 580 nm-700 nm of the optical lens element made of the plastic material is T5870, the following conditions are satisfied:

$50\% \leq T4050$;
$50\% \leq T5058$; and
$10\% \leq T5870$.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
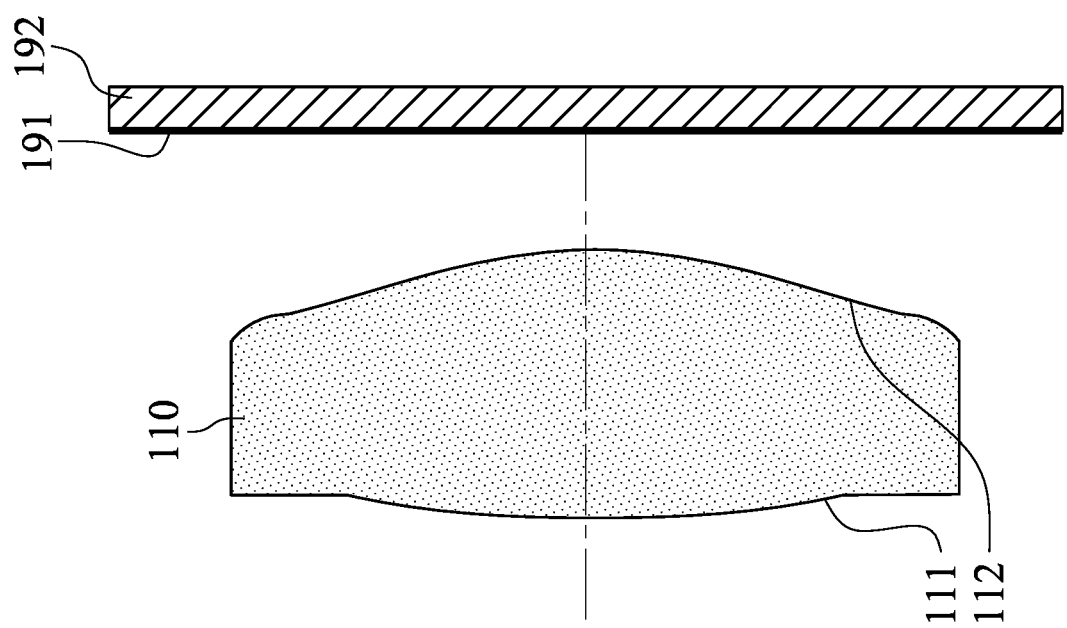
FIG. 1 is a schematic view of an image capturing apparatus according to the 1st embodiment of the present disclosure.

An optical image lens assembly includes, in order from an object side to an image side, at least one optical lens element. Therefore, lights can be effectively converged so as to be focused to form an image.

The optical lens element made of a plastic material includes at least one long-wavelength light absorbing agent, and the long-wavelength light absorbing agent is homogeneously mixed with the plastic material, wherein the optical lens element including the long-wavelength light absorbing agent has refractive power (positive refractive power or negative refractive power), and at least one of the object-side surface and the image-side surface of the optical lens element is aspheric. Therefore, the surface shape of the optical lens element can be designed according to practical needs, such as eliminating aberrations so as to enhance the image quality. Moreover, aspheric surfaces can satisfy the demand of miniaturization design, and a proper plastic material can meet the purpose of mass production. Therefore, it is favorable for absorbing long-wavelength lights, so that the color shift resulted from the image sensor receiving long-wavelength lights can be avoided. Accordingly, the image can truly reflect the color seen by human eyes. Moreover, when at least one of the optical lens elements of the optical image lens assembly can absorb long-wavelength lights, an extra IR-cut filter is not required for the optical image lens assembly, which is favorable for reducing the number of elements used in the optical image lens assembly. Accordingly, the optical image lens assembly can be more compact, and is favorable to be applied to thin electron products. Also, the optical image lens assembly is favorable to be configured as a multi-lens structure, so that the demands of compact size and high image quality can be satisfied. Moreover, instead of featuring the optical lens element with the long-wavelength light absorbing capability by the lens coating technology, the long-wavelength light absorbing agent is homogeneously mixed with the plastic material of the optical lens element, so that the shortcomings of high cost and high technical difficulty caused by the lens coating technology can be avoided. Accordingly, the cost can be reduced and the yield rate can be enhanced.

In the optical image lens assembly according to the present disclosure, when an average transmittance in a wavelength range of 650 nm-700 nm of the optical lens element including the long-wavelength light absorbing agent is T6570, and an average transmittance in a wavelength range of 400 nm-650 nm of the optical lens element including the long-wavelength light absorbing agent is T4065, the following conditions can be satisfied: T6570≤50%; and 50%≤T4065. Therefore, the surface shape of the optical lens element can be designed according to practical needs, such as eliminating aberrations so as to enhance the image quality and the aspheric surfaces can satisfy the demand of miniaturization design. Moreover, the purpose of mass production can be satisfied by selecting the proper plastic material, which is favorable for facilitating the absorption of long-wavelength lights, and the color shift resulted from the image sensor receiving long-wavelength lights can be avoided. Accordingly, the image can truly reflect the color seen by human eyes.

In the optical image lens assembly according to the present disclosure, when a maximum thickness of the optical lens element including the long-wavelength light absorbing agent is TKmax, and a minimum thickness of the optical lens element including the long-wavelength light absorbing agent is TKmin, the following condition can be satisfied: 1.0<TKmax/TKmin≤2.0. Therefore, it is favorable for absorbing long-wavelength lights, so that the color shift resulted from the image sensor receiving long-wavelength lights can be avoided. Accordingly, the image can truly reflect the color seen by human eyes. In addition, when at least one of the optical lens elements of the optical image lens assembly can absorb long-wavelength lights, an extra IR-cut filter is not required for the optical image lens assembly, which is favorable for reducing the number of elements used in the optical image lens assembly, and the optical image lens assembly can be more compact and is favorable to be applied to thin electron products as well as applied to the optical image lens assembly with a plurality of optical lens, so that the demands of compact size and high image quality can be satisfied. Moreover, instead of featuring the optical lens element with the long-wavelength light absorbing capability by the lens coating technology, the long-wavelength light absorbing agent is homogeneously mixed with the plastic material of the optical lens element, so that the shortcomings of high cost and high technical difficulty caused by the lens coating technology can be avoided. Accordingly, the cost can be reduced and the yield rate can be enhanced.

In the optical image lens assembly according to the present disclosure, wherein the long-wavelength light absorbing agent can be an organic material. Therefore, it is favorable for maintaining the transparency of the optical lens element. The aforementioned long-wavelength light absorbing agent refers to a material which can absorb the long-wavelength lights. Specifically, the optical lens element including the long-wavelength light absorbing agent has a maximum transmittance greater than 75% in a wavelength range of 450 nm-600 nm, and a minimum transmittance less than 75% in a wavelength range of 630 nm-1400 nm. Preferably, the optical lens element including the long-wavelength light absorbing agent has a minimum transmittance less than 75% in a wavelength range of 700 nm-1400 nm. More preferably, the optical lens element including the long-wavelength light absorbing agent has a minimum transmittance less than 75% in a wavelength range of 630 nm-850 nm. Even more preferably, the optical lens element including the long-wavelength light absorbing agent has a minimum transmittance less than 75% in a wavelength range of 700 nm-850 nm. More specifically, the long-wavelength light absorbing agent has a maximum absorption peak in a wavelength range of 630 nm-1000 nm, and has a low absorption rate for lights in a wavelength range of 400 nm-629 nm. Preferably, the long-wavelength light absorbing agent has the maximum absorption peak in a wavelength range of 650 nm-850 nm. For example, the long-wavelength light absorbing agent can be but is not limited to cyanine derivatives, indocyanine derivatives, phthalocyanine derivatives, naphthalocyanine derivatives, metal complex of phthalocyanine derivatives, metal complex of naphthalocyanine derivatives, metal complex of dithiolene derivatives, quinone derivatives, anthraquinone derivatives, naphthoquinone derivatives, azo derivatives, porphyrin derivatives, isoporphyrin derivatives, corrole derivatives, squaraine derivatives, squarylium derivatives, boron difluoride dipyrromethenes, diimmonium derivatives or methylene blue derivatives. The cyanine derivatives can be cyanine dyes (Cy dyes), such as Cy5, Cy 5.5 or Cy7. The indocyanine derivatives can be indocyanine dyes. The phthalocyanine derivatives can be phthalocyanine dyes. The naphthalocyanine derivatives can be naphthalocyanine dyes. The quinone derivatives can be quinone dyes. The anthraquinone derivatives can be anthraquinone dyes. The naphthoquinone derivatives can be naphthoquinone dyes. The azo derivatives can be azo dyes. The porphyrin derivatives can be porphyrin dyes. The isoporphyrin derivatives can be isoporphyrin dyes. The corrole derivatives can be corrole dyes. The squaraine derivatives can be squaraine dyes. The squarylium derivatives can be squarylium dyes. The boron difluoride dipyrromethenes can be boron difluoride dipyrromethene dyes. The diimmonium derivatives can be diimmonium dyes. The methylene blue derivatives can be methylene blue dyes. The long-wavelength light absorbing agent can be but is not limited to the product produced by Epolin Co., Ltd. with the name of Epolight 5262, Epolight 5839, Epolight 6661, Epolight 6158, Epolight 6084, Epolight 6698, Epolight 6818, Epolight 4101, Epolight 4037, Epolight 9151, Epolight 3079, Epolight 3036, Epolight 4016, Epolight 3030 or Epolight 4159. Alternatively, the long-wavelength light absorbing agent can be but is not limited to the product produced by Adam Gates & Company with the name of IR Dye 9658, IR Dye 9669, IR Dye 9678, IR Dye 9684, IR Dye 6085, IR Dye 6084, IR Dye 9692, IR Dye 9711, IR Dye 5739, IR Dye 9740, IR Dye 7151, IR Dye 7154, IR Dye 9772, IR Dye 9645, IR Dye 9579, IR Dye 9158, IR Dye 7036, IR Dye 9775, IR Dye 9784, IR Dye 2630, IR Dye 5159, IR Dye 9798 or IR Dye 5803. Alternatively, the long-wavelength light absorbing agent can be but is not limited to the product produced by Exciton Co., Ltd. with the commercial name of ABS 642, ABS 643, ABS 647, ABS 654, ABS 658, ABS 659, ABS 665, ABS 667, ABS 668, ABS 670T, ABS 674, ABS 691, ABS 694, IRA 677, IRA 693N, IRA 705, IRA 732, IRA 735, IRA 764, IRA 788, IRA 800 or NP 800. Alternatively, the long-wavelength light absorbing agent can be but is not limited to the product produced by Molecular Probes Co., Ltd. with the name of Alexa Fluor 633, Alexa Fluor 647, Alexa Fluor 660, Alexa Fluor 680, Alexa Fluor 700 or Alexa Fluor 750. Alternatively, the long-wavelength light absorbing agent can be but is not limited to the product produced by Li-Cor Co., Ltd. with the commercial name of IRDye 650, IRDye 680RD, IRDye 680LT, IRDye 700, IRDye 700DX, IRDye 750, IRDye 800, IRDye 800RS, IRDye 800CW, IRDye 9711 or IRDye 9740. The long-wavelength light absorbing agent can be the analogue of the aforementioned products. Moreover, the aforementioned to long-wavelength light absorbing agents can be used separately or simultaneously.

In the optical image lens assembly according to the present disclosure, the optical lens element closest to the object side can have positive refractive power. Therefore, the refractive power of the optical image lens assembly for converging lights can be provided, and is favorable for miniaturization.

In the optical image lens assembly according to the present disclosure, the optical lens element closest to the object side can have negative refractive power. Therefore, the field of view can be broadened so as to increase the image-capturing range.

In the optical image lens assembly according to the present disclosure, the plastic material can be amorphous polymer, and is transparent for visible lights in the wavelength range of 400 nm-629 nm. That is, a transmittance of the plastic material in the wavelength range of 400 nm-629 nm is greater than or equal to 75%. Moreover, the plastic material can be a thermoplastic polymer, and it is favorable for increasing the efficiency of the optical lens element formation and for enhancing the yield rate. In addition, the plastic material can be polycarbonate (PC), which can enhance the manufacturing stability and the molding accuracy. Specifically, the plastic material can be but is not limited to polycarbonate, cyclo olefin copolymer (COC), cyclo olefin polymer (COP) or a mixture thereof. That is, the aforementioned plastic materials can be used separately or simultaneously. Therefore, the plastic material is proper, which can enhance the manufacturing stability and the molding accuracy.

In the optical image lens assembly according to the present disclosure, wherein the optical lens element including the long-wavelength light absorbing agent can be formed by an injection molding method. Therefore, the manufacturing efficiency of optical lens elements can be enhanced.

In the optical image lens assembly according to the present disclosure, when the average transmittance in the wavelength range of 400 nm-650 nm of the optical lens element including the long-wavelength light absorbing agent is T4065, the following condition can be satisfied: 75%≤T4065. Therefore, an excellent respond of the image sensor for the visible lights can be maintained which is favorable for maintaining the color authenticity so as to reduce the degree of color shift.

In the optical image lens assembly according to the present disclosure, when the average transmittance in the wavelength range of 650 nm-700 nm of the optical lens element including the long-wavelength light absorbing agent is T6570, the following condition can be satisfied: T6570≤30%. Therefore, the defect of reddish image can be reduced.

In the optical image lens assembly according to the present disclosure, when an average transmittance in a wavelength range of 700 nm-750 nm of the optical lens element including the long-wavelength light absorbing agent is T7075, the following condition can be satisfied: 30%≤T7075. Therefore, the defect of reddish image can be further avoided. Alternatively, the following condition can be satisfied: 50%≤T7075.

In the optical image lens assembly according to the present disclosure, wherein at least one of the object-side surface and the image-side surface of the optical lens element including the long-wavelength light absorbing agent includes a coating with a capability to absorb a light in a wavelength range more than 700 nm. When an average transmittance in a wavelength range of 700 nm-750 nm of the optical lens element including the long-wavelength light absorbing agent is T7075, the following condition can be satisfied: T7075≤35%. Therefore, the infrared lights can be absorbed effectively so that the color shift of the image can be avoided.

In the optical image lens assembly according to the present disclosure, when a central thickness of the optical lens element including the long-wavelength light absorbing agent is CTa, the following condition can be satisfied: CTa≤1.00 mm. Therefore, the central thickness of the optical lens element is proper for maintaining the stable absorption effect for the long-wavelength lights. Alternatively, the following condition can be satisfied: 0.10 mm≤CTa≤1.00 mm. Alternatively, the following condition can be satisfied: 0.15 mm≤CTa≤0.80 mm. Alternatively, the following condition can be satisfied: 0.20 mm≤CTa≤0.50 mm.

In the optical image lens assembly according to the present disclosure, when a sum of central thicknesses of the optical lens elements including the long-wavelength light absorbing agent is sumCTa, the following condition can be satisfied: 0.10 mm≤sumCTa≤20.0 mm. Therefore, the miniaturization of the optical image lens assembly and the absorption effect for long-wavelength lights can be balanced. Alternatively, the following condition can be satisfied: 0.10 mm≤sumCTa≤15.00 mm. Alternatively, the following condition can be satisfied: 0.10 mm≤sumCTa≤10.00 mm. Alternatively, the following condition can be satisfied: 0.15 mm≤sumCTa≤5.00 mm. Alternatively, the following condition can be satisfied: 0.15 mm≤sumCTa≤2.00 mm. Alternatively, the following condition can be satisfied: 0.20 mm≤sumCTa≤1.00 mm.

In the optical image lens assembly according to the present disclosure, when a glass transition temperature of the optical lens element including the long-wavelength light absorbing agent is Tg, the following condition can be satisfied: 131° C.≤Tg≤165° C. Therefore, the efficiency of the injection molding method and the yield rate of the optical lens element can be enhanced.

In the optical image lens assembly according to the present disclosure, when a transmittance of the optical lens element including the long-wavelength light absorbing agent is T, the following condition can be satisfied: 90%≤T. Therefore, the transmittance of the optical lens element is high and the luminous flux can be enhanced. Alternatively, the following condition can be satisfied: 90%≤T≤93%.

In the optical image lens assembly according to the present disclosure, when an Abbe number of the optical lens element including the long-wavelength light absorbing agent is V, the following condition can be satisfied: 15.0≤V≤37.5. Therefore, it is favorable for correcting the color difference while the image is formed.

In the optical image lens assembly according to the present disclosure, when a haze value of the optical lens element including the long-wavelength light absorbing agent is Hz, the following condition can be satisfied: 0.3%≤Hz≤0.5%. Therefore, the transparency of the optical lens element can be enhanced.

In the optical image lens assembly according to the present disclosure, when a refractive index of the optical lens element including the long-wavelength light absorbing agent is N, the following condition can be satisfied: 1.6≤N. Therefore, it is favorable for obtaining high refractivity of the optical lens element, and the color difference can be corrected.

In the optical image lens assembly according to the present disclosure, when the sum of central thicknesses of the one optical lens elements including the long-wavelength light absorbing agent is sumCTa, and a sum of central thicknesses of the optical lens elements is sumCT, the following condition can be satisfied: sumCTa/sumCT≤1. Alternatively, the following condition can be satisfied: sumCTa/sumCT≤0.8. Alternatively, the following condition can be satisfied: sumCTa/sumCT≤0.4. Alternatively, the following condition can be satisfied: sumCTa/sumCT≤0.25. Therefore, the miniaturization of the optical image lens assembly and the absorption effect for long-wavelength lights can be balanced.

In the optical image lens assembly according to the present disclosure, wherein a number of the optical lens elements including the long-wavelength light absorbing agent can be greater than or equal to two. Therefore, the absorption effect for long-wavelength lights can be effectively enhanced.

In the optical image lens assembly according to the present disclosure, wherein the optical image lens assembly includes at least four of the optical lens elements. Therefore, it is favorable for enhancing the image quality of the optical image lens assembly with a multi-lens structure, so that the photographing demands of high image pixel and the high image quality can be satisfied. Alternatively, the number of the optical lens elements can be greater than or equals to five, and at least five of the optical lens elements have refractive power. Alternatively, the number of the optical lens elements can be greater than or equals to six, and at least six of the optical lens elements have refractive power. Alternatively, the number of the optical lens elements can be greater than or equals to seven, and at least seven of the optical lens elements have refractive power. Alternatively, the number of the optical lens elements can be greater than or equals to eight, and at least eight of the optical lens elements have refractive power.

In the optical image lens assembly according to the present disclosure, wherein the optical image lens assembly includes a plurality of the optical lens elements, and the optical lens element including the long-wavelength light absorbing agent is a second optical lens element or a third optical lens element among the optical lens elements in order from an object side to an image side. Specifically, the optical lens element including the long-wavelength light absorbing agent is the second optical lens element among the optical lens elements in order from an object side to an image side. Alternatively, the optical lens element including the long-wavelength light absorbing agent is the third optical lens element among the optical lens elements in order from an object side to an image side. Alternatively, the optical lens elements including the long-wavelength light absorbing agent are the second optical lens element and the third optical lens element among the optical lens elements in order from an object side to an image side. Therefore, the absorption effect of the optical image lens assembly for infrared lights can be ensured, which can prevent the image sensor responding to the infrared lights. Accordingly, the color distortion and the interference of the image can be avoided.

In the optical image lens assembly according to the present disclosure, when a maximum of maximum effective diameters of the optical lens elements including the long-wavelength light absorbing agent is ϕ max, the following condition can be satisfied: 0.50 mm≤ϕ max≤60.00 mm. Therefore, the maximum effective diameter of the optical lens element is proper, which is favorable for maintaining the compact size of the optical image lens assembly. Moreover, when the maximum effective diameter is close to the lower limit value, the molding stability of the optical lens element during the injection molding process can be enhanced, and the residual stress can be reduced. Alternatively, the following condition can be satisfied: 0.50 mm≤ϕ max≤50.0 mm. Alternatively, the following condition can be satisfied: 0.50 mm≤ϕ max≤40.00 mm. Alternatively, the following condition can be satisfied: 1.00 mm≤ϕ max≤30.00 mm. Alternatively, the following condition can be satisfied: 1.00 mm≤ϕ max≤20.00 mm. Alternatively, the following condition can be satisfied: 1.00 mm≤ϕ max≤10.00 mm.

In the optical image lens assembly according to the present disclosure, when the maximum of maximum effective diameters of the optical lens elements including the long-wavelength light absorbing agent is ϕ max, and the sum of central thicknesses of the optical lens elements including the long-wavelength light absorbing agent is sumCTa, the following condition can be satisfied: 0.10≤ϕ max/sumCTa. Therefore, the miniaturization of the optical image lens assembly and the absorption effect for long-wavelength lights can be balanced, and the manufacturing performance and the finished product quality of the plastic molding can be enhanced. Alternatively, the following condition can be satisfied: 0.50≤ϕ max/sumCTa≤20.00. Alternatively, the following condition can be satisfied: 1.00≤ϕ max/sumCTa≤10.00. Specifically, the optical image lens assembly can include only one optical lens element including the long-wavelength light absorbing agent or a plurality of optical lens elements including the long-wavelength light absorbing agent. When the optical image lens assembly only includes one optical lens element including the long-wavelength light absorbing agent, ϕ max is a maximum effective diameter of the optical lens element including the long-wavelength light absorbing agent, and sumCTa is a central thickness of the optical lens element including the long-wavelength light absorbing agent. When the optical image lens assembly includes a plurality of optical lens elements including the long-wavelength light absorbing agent, ϕ max is a maximum of maximum effective diameters of the plurality of optical lens elements including the long-wavelength light absorbing agent, and sumCTa is a sum of central thicknesses of the plurality of optical lens elements including the long-wavelength light absorbing agent.

In the optical image lens assembly according to the present disclosure, when a wavelength correspondent to a 50% transmittance of the optical lens element including the long-wavelength light absorbing agent is WLT50, the following condition can be satisfied: 550 nm≤WLT50≤700 nm. Therefore, the color authenticity can be maintained. Alternatively, the following condition can be satisfied: 600 nm≤WLT50≤700 nm. Alternatively, the following condition can be satisfied: 630 nm≤WLT50≤700 nm. Alternatively, the following condition can be satisfied: 650 nm≤WLT50≤700 nm. Alternatively, the following condition can be satisfied: 650 nm≤WLT50≤690 nm.

In the optical image lens assembly according to the present disclosure, when a minimum transmittance in infrared region of the optical lens element including the long-wavelength light absorbing agent is TIRmin, the following condition can be satisfied: TIRmin≤30%. Therefore, the absorption for the infrared lights can be enhanced. Alternatively, the following condition can be satisfied: TIRmin≤20%. Alternatively, the following condition can be satisfied: TIRmin≤10%. Alternatively, the following condition can be satisfied: TIRmin≤5%. Alternatively, the following condition can be satisfied: TIRmin≤1%. The infrared region is in the wavelength range of 700 nm-1400 nm.

In the optical image lens assembly according to the present disclosure, when an average transmittance in red visible light region of the optical lens element including the long-wavelength light absorbing agent is T5870, the following condition can be satisfied: 50%≤T5870. Therefore, an excellent respond of the image sensor for the red visible lights can be maintained, which is favorable for maintaining the color authenticity and the degree of color shift can be reduced. Alternatively, the following condition can be satisfied: 60%≤T5870. Alternatively, the following condition can be satisfied: 70%≤T5870. Alternatively, the following condition can be satisfied: 80%≤T5870. The red visible light region is in a wavelength range of 580 nm-700 nm.

In the optical image lens assembly according to the present disclosure, when an average transmittance in green visible light region of the optical lens element including the long-wavelength light absorbing agent is T5058, the following condition can be satisfied: 75%≤T5058. Therefore, an excellent respond of the image sensor for the green visible lights can be maintained, which is favorable for maintaining the color authenticity and the degree of color shift can be reduced. Alternatively, the following condition can be satisfied: 80%≤T5058. Alternatively, the following condition can be satisfied: 90%≤T5058. The green visible light region is in a wavelength range of 500 nm-580 nm.

In the optical image lens assembly according to the present disclosure, when an average transmittance in blue visible light region of the optical lens element including the long-wavelength light absorbing agent is T4050, the following condition can be satisfied: 75%≤T4050. Therefore, an excellent respond of the image sensor for the blue visible lights can be maintained, which is favorable for maintaining the color authenticity and the degree of color shift can be reduced. Alternatively, the following condition can be satisfied: 80%≤T4050. Alternatively, the following condition can be satisfied: 90%≤T4050. The blue visible light region is in a wavelength range of 400 nm-500 nm.

In the optical image lens assembly according to the present disclosure, an average transmittance in visible light region (400 nm-700 nm) of the optical lens element including the long-wavelength light absorbing agent is preferably greater than or equal to 80%. More preferably, the average transmittance in visible light region of the optical lens element including the long-wavelength light absorbing agent is preferably greater than or equal to 85%.

In the optical image lens assembly according to the present disclosure, the optical lens element including the long-wavelength light absorbing agent can also include at least one short-wavelength light absorbing agent. The short-wavelength light absorbing agent is homogeneously mixed with the plastic material. Therefore, it is favorable for absorbing short-wavelength lights. The deterioration of the optical lens element can be prevented, so that the durability and the image quality of the optical image lens assembly can be enhanced. The short-wavelength light absorbing agent refers to a material has an average transmittance less than 50% in a wavelength range of 280 nm-400 nm. For example, the short-wavelength light absorbing agent can be but is not limited to the product produced by BASF chemical Co., Ltd. with the name of Tinuvin 326, Tinuvin 477 or Tinuvin Carboprotect.

According to the present disclosure, an image capturing apparatus is provided. The image capturing apparatus includes the optical image lens assembly and an image sensor, wherein the image sensor is disposed on an image surface of the optical image lens assembly. The optical image lens assembly includes the at least one optical lens element including at least one long-wavelength light absorbing agent. Therefore, the number of elements used in the optical image lens assembly can be reduced. Accordingly, the image capturing apparatus is more compact, and is favorable to be applied to mobile products. Also, the cost of the image capturing apparatus can be reduced and the yield rate can be enhanced. Preferably, the image capturing apparatus can further include a barrel member, a holder member or a combination thereof.

According to the present disclosure, an electronic device is provided. The electronic device, which is a mobile photographing device or a portable device, includes the aforementioned image capturing apparatus. Therefore, the number of elements used in the optical image lens assembly can be reduced. Accordingly, the electronic device is more compact. Also, the cost of the electronic device can be reduced and the yield rate can be enhanced. Preferably, the electronic device can further include but not limited to a control unit, a display, a storage unit, a random access memory unit (RAM), a read only memory unit (ROM) or a combination thereof.

According to the present disclosure, a plastic material for manufacturing the optical lens element of the optical image lens assembly is provided. When an average transmittance in a wavelength range of 400 nm-500 nm of the optical lens element made of the plastic material is T4050, an average transmittance in a wavelength range of 500 nm-580 nm of the optical lens element made of the plastic material is T5058, and an average transmittance in a wavelength range of 580 nm-700 nm of the optical lens element made of the plastic material is T5870, the following conditions can be satisfied: 50%≤T4050; 50%≤T5058; and 10%≤T5870. Therefore, an excellent respond of the image sensor for the blue visible lights, the green visible lights and the red visible lights can be maintained, which is favorable for maintaining the color authenticity and the degree of color shift can be reduced.

According to the above description of the present disclosure, the following specific embodiments are provided for further explanation.

1st Embodiment

FIG. 1 is a schematic view of an image capturing apparatus according to the 1st embodiment of the present disclosure. In FIG. 1, the image capturing apparatus includes an optical image lens assembly (its reference numeral is omitted) and an image sensor 192. The optical image lens assembly includes, in order from an object side to an image side, a first optical lens element 110 and an image surface 191, wherein the image sensor 192 is disposed on the image surface 191 of the optical image lens assembly. The optical image lens assembly can selectively include other elements, such as an aperture stop (not shown). The other elements are not the key points and will not be described herein.

The first optical lens element 110 with positive refractive power has an object-side surface 111 being convex in a paraxial region thereof and an image-side surface 112 being convex in a paraxial region thereof, and has the object-side surface 111 and the image-side surface 112 being both aspheric. The first optical lens element 110 is made of a plastic material (its reference numeral is omitted), and includes at least one long-wavelength light absorbing agent (its reference numeral is omitted). The long-wavelength light absorbing agent is homogeneously mixed with the plastic material. When a central thickness of the first optical lens element 110 including the long-wavelength light absorbing agent is CT1, the following condition is satisfied: CT1=1.41 mm. When a wavelength correspondent to a 50% transmittance of the first optical lens element 110 including the long-wavelength light absorbing agent is WLT50, the following condition can be satisfied: 550 nm≤WLT50≤700 nm. When a minimum transmittance in infrared region of the first optical lens element 110 including the long-wavelength light absorbing agent is TIRmin, the following condition can be satisfied: TIRmin≤30%. When an average transmittance in a wavelength range of 700 nm-750 nm of the first optical lens element 110 including the long-wavelength light absorbing agent is T7075, an average transmittance in a wavelength range of 650 nm-700 nm of the first optical lens element 110 including the long-wavelength light absorbing agent is T6570, an average transmittance in a wavelength range of 400 nm-650 nm of the first optical lens element 110 including the long-wavelength light absorbing agent is T4065, an average transmittance in red visible light region of the first optical lens element 110 including the long-wavelength light absorbing agent is T5870, an average transmittance in green visible light region of the first optical lens element 110 including the long-wavelength light absorbing agent is T5058, and an average transmittance in blue visible light region of the first optical lens element 110 including the long-wavelength light absorbing agent is T4050, the following conditions can be satisfied: 30%≤T7075; T6570≤50%; 50%≤T4065; 50%≤T5870; 75%≤T5058; and 75%≤T4050.

In the optical image lens assembly of the 1st embodiment, when a maximum thickness of the first optical lens element 110 is TKmax, and a minimum thickness of the first optical lens element 110 is TKmin, the following conditions are satisfied: TKmax=1.41 mm, TKmin=0.81 mm, and TKmax/TKmin=1.74.

In the optical image lens assembly of the 1st embodiment, a sum of a central thickness of the optical lens element including the long-wavelength light absorbing agent is sumCTa (in the 1st embodiment, only the first optical lens element 110 includes the long-wavelength light absorbing agent, that is, sumCTa equals to the central thickness CT1 of the first optical lens element 110), a sum of a central thickness of the optical lens element is sumCT (in the 1st embodiment, sumCT equals to the central thickness CT1 of the first optical lens element 110), and a maximum of a maximum effective diameter of the optical lens element including the long-wavelength light absorbing agent is ϕ max (in the 1st embodiment, ϕ max equals to a maximum effective diameter of the first optical lens element 110), the following conditions are satisfied: sumCTa=1.41 mm; sumCT=1.41 mm; ϕ max=3.72 mm; sumCTa/sumCT=1.00; and ϕ max/sumCTa=2.64.

The details of the plastic material and the long-wavelength light absorbing agent have been mentioned above, and are not repeated herein.

In the first optical lens element 110, the dots therein represent the long-wavelength light absorbing agent, and the blank portion therein represents the plastic material, which intends to express that the long-wavelength light absorbing agent is homogeneously mixed with the plastic material. The size of the dots and the distribution of the dots have no special meanings. For example, the size of the dots and the distribution of the dots do not represent the particle size of the long-wavelength light absorbing agent, the concentration of the long-wavelength light absorbing agent, or the kind of the long-wavelength light absorbing agent. The size of the dots and the distribution of the dots also have no special meanings in the following embodiments. Therefore, an explanation in this regard will not be provided again.

2nd Embodiment

Figure 2:
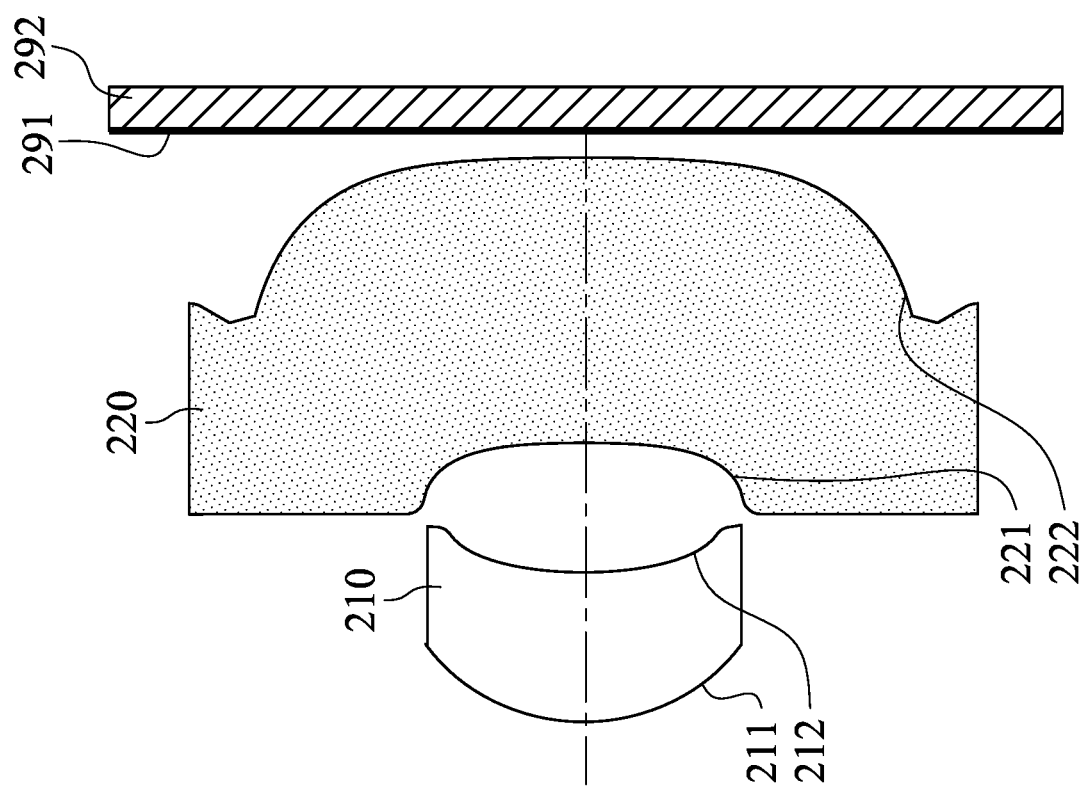
FIG. 2 is a schematic view of an image capturing apparatus according to the 2nd embodiment of the present disclosure.

FIG. 2 is a schematic view of an image capturing apparatus according to the 2nd embodiment of the present disclosure. In FIG. 2, the image capturing apparatus includes an optical image lens assembly (its reference numeral is omitted) and an image sensor 292. The optical image lens assembly includes, in order from an object side to an image side, a first optical lens element 210, a second optical lens element 220 and an image surface 291, wherein the image sensor 292 is disposed on the image surface 291 of the optical image lens assembly. The optical image lens assembly can selectively include other elements, such as an aperture stop (not shown). The other elements are not the key points and will not be described herein.

The first optical lens element 210 with positive refractive power has an object-side surface 211 being convex in a paraxial region thereof and an image-side surface 212 being concave in a paraxial region thereof, and has the object-side surface 211 and the image-side surface 212 being both aspheric. When a central thickness of the first optical lens element 210 is CT1, the following condition is satisfied: CT1=0.23 mm.

The second optical lens element 220 with negative refractive power has an object-side surface 221 being concave in a paraxial region thereof and an image-side surface 222 being convex in a paraxial region thereof, and has the object-side surface 221 and the image-side surface 222 being both aspheric. The second optical lens element 220 is made of a plastic material (its reference numeral is omitted), and includes at least one long-wavelength light absorbing agent (its reference numeral is omitted). The long-wavelength light absorbing agent is homogeneously mixed with the plastic material. When a central thickness of the second optical lens element 220 including the long-wavelength light absorbing agent is CT2, the following condition is satisfied: CT2=0.43 mm. When a wavelength correspondent to a 50% transmittance of the second optical lens element 220 including the long-wavelength light absorbing agent is WLT50, the following condition can be satisfied: 550 nm≤WLT50≤700 nm. When a minimum transmittance in infrared region of the second optical lens element 220 including the long-wavelength light absorbing agent is TIRmin, the following condition can be satisfied: TIRmin≤30%. When an average transmittance in a wavelength range of 700 nm-750 nm of the second optical lens element 220 including the long-wavelength light absorbing agent is T7075, an average transmittance in a wavelength range of 650 nm-700 nm of the second optical lens element 220 including the long-wavelength light absorbing agent is T6570, an average transmittance in a wavelength range of 400 nm-650 nm of the second optical lens element 220 including the long-wavelength light absorbing agent is T4065, an average transmittance in red visible light region of the second optical lens element 220 including the long-wavelength light absorbing agent is T5870, an average transmittance in green visible light region of the second optical lens element 220 including the long-wavelength light absorbing agent is T5058, and an average transmittance in blue visible light region of the second optical lens element 220 including the long-wavelength light absorbing agent is T4050, the following conditions can be satisfied: 30%≤T7075; T6570≤50%; 50%≤T4065; 50%≤T5870; 75%≤T5058; and 75%≤T4050.

In the optical image lens assembly of the 2nd embodiment, when a maximum thickness of the second optical lens element 220 is TKmax, and a minimum thickness of the second optical lens element 220 is TKmin, the following conditions are satisfied: TKmax=0.43 mm, TKmin=0.29 mm, and TKmax/TKmin=1.48.

In the optical image lens assembly of the 2nd embodiment, a sum of central thicknesses of the optical lens elements including the long-wavelength light absorbing agent is sumCTa (in the 2nd embodiment, only the second optical lens element 220 includes the long-wavelength light absorbing agent, that is, sumCTa equals to the central thickness CT2 of the second optical lens element 220), a sum of central thicknesses of the optical lens elements is sumCT (in the 2nd embodiment, sumCT equals to the central thickness CT1 of the first optical lens element 210 plus the central thickness CT2 of the second optical lens element 220), and a maximum of maximum effective diameters of the optical lens elements including the long-wavelength light absorbing agent is ϕ max (in the 2nd embodiment, ϕ max equals to a maximum effective diameter of the second optical lens element 220), the following conditions are satisfied: sumCTa=0.43 mm; sumCT=0.66 mm; ϕ max=1.20 mm; sumCTa/sumCT=0.65; and ϕ max/sumCTa=2.78.

The details of the plastic material and the long-wavelength light absorbing agent have been mentioned above, and are not repeated herein.

3rd Embodiment

Figure 3:
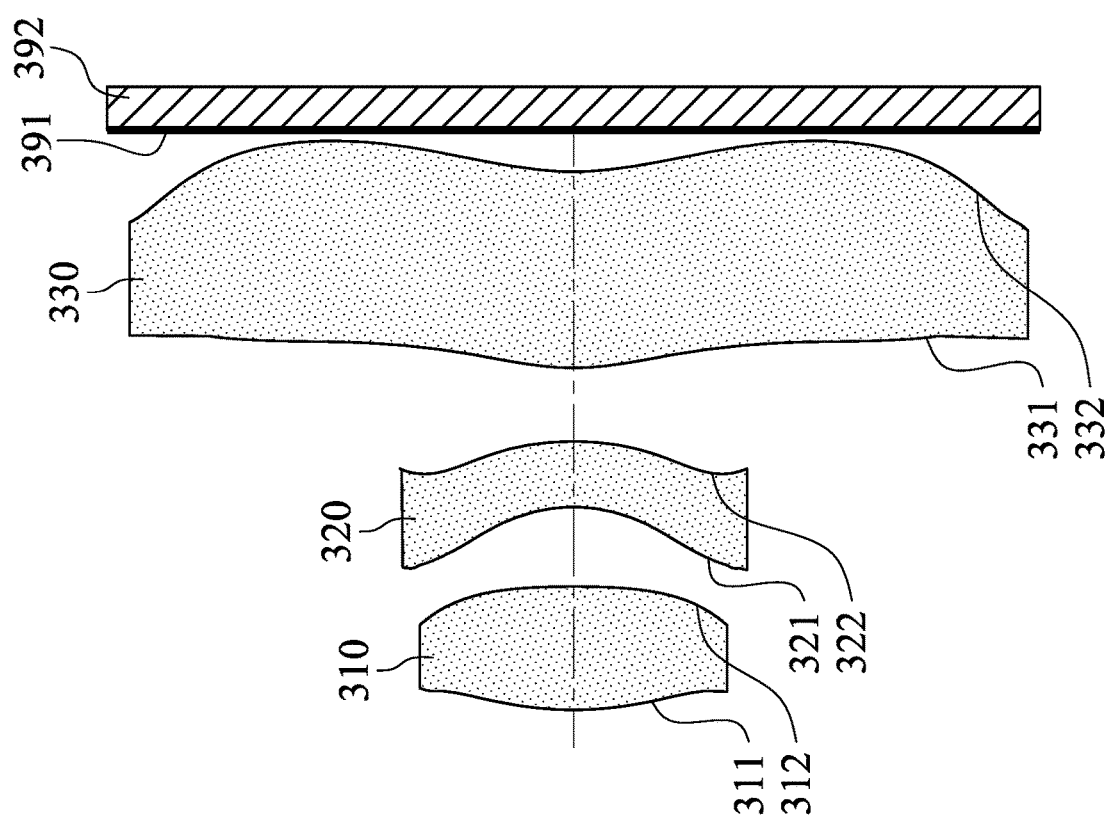
FIG. 3 is a schematic view of an image capturing apparatus according to the 3rd embodiment of the present disclosure.

FIG. 3 is a schematic view of an image capturing apparatus according to the 3rd embodiment of the present disclosure. In FIG. 3, the image capturing apparatus includes an optical image lens assembly (its reference numeral is omitted) and an image sensor 392. The optical image lens assembly includes, in order from an object side to an image side, a first optical lens element 310, a second optical lens element 320, a third optical lens element 330 and an image surface 391, wherein the image sensor 392 is disposed on the image surface 391 of the optical image lens assembly. The optical image lens assembly can selectively include other elements, such as an aperture stop (not shown). The other elements are not the key points and will not be described herein.

The first optical lens element 310 with positive refractive power has an object-side surface 311 being convex in a paraxial region thereof and an image-side surface 312 being convex in a paraxial region thereof, and has the object-side surface 311 and the image-side surface 312 being both aspheric. The first optical lens element 310 is made of a plastic material (its reference numeral is omitted), and includes at least one long-wavelength light absorbing agent (its reference numeral is omitted). The long-wavelength light absorbing agent is homogeneously mixed with the plastic material. When a central thickness of the first optical lens element 310 including the long-wavelength light absorbing agent is CT1, the following condition is satisfied: CT1=0.21 mm. When a wavelength correspondent to a 50% transmittance of the first optical lens element 310 including the long-wavelength light absorbing agent is WLT50, the following condition can be satisfied: 550 nm≤WLT50≤700 nm. When a minimum transmittance in infrared region of the first optical lens element 310 including the long-wavelength light absorbing agent is TIRmin, the following condition can be satisfied: TIRmin≤30%. When an average transmittance in a wavelength range of 700 nm-750 nm of the first optical lens element 310 including the long-wavelength light absorbing agent is T7075, an average transmittance in a wavelength range of 650 nm-700 nm of the first optical lens element 310 including the long-wavelength light absorbing agent is T6570, an average transmittance in a wavelength range of 400 nm-650 nm of the first optical lens element 310 including the long-wavelength light absorbing agent is T4065, an average transmittance in red visible light region of the first optical lens element 310 including the long-wavelength light absorbing agent is T5870, an average transmittance in green visible light region of the first optical lens element 310 including the long-wavelength light absorbing agent is T5058, and an average transmittance in blue visible light region of the first optical lens element 310 including the long-wavelength light absorbing agent is T4050, the following conditions can be satisfied: 30%≤T7075; T6570≤50%; 50% T4065; 50%≤T5870; 75%≤T5058; and 75%≤T4050.

The second optical lens element 320 with negative refractive power has an object-side surface 321 being concave in a paraxial region thereof and an image-side surface 322 being convex in a paraxial region thereof, and has the object-side surface 321 and the image-side surface 322 being both aspheric. The second optical lens element 320 is made of a plastic material (its reference numeral is omitted), and includes at least one long-wavelength light absorbing agent (its reference numeral is omitted). The long-wavelength light absorbing agent is homogeneously mixed with the plastic material. When a central thickness of the second optical lens element 320 including the long-wavelength light absorbing agent is CT2, the following condition is satisfied: CT2=0.11 mm. When a wavelength correspondent to a 50% transmittance of the second optical lens element 320 including the long-wavelength light absorbing agent is WLT50, the following condition can be satisfied: 550 nm≤WLT50≤700 nm. When a minimum transmittance in infrared region of the second optical lens element 320 including the long-wavelength light absorbing agent is TIRmin, the following condition can be satisfied: TIRmin≤30%. When an average transmittance in a wavelength range of 700 nm-750 nm of the second optical lens element 320 including the long-wavelength light absorbing agent is T7075, an average transmittance in a wavelength range of 650 nm-700 nm of the second optical lens element 320 including the long-wavelength light absorbing agent is T6570, an average transmittance in a wavelength range of 400 nm-650 nm of the second optical lens element 320 including the long-wavelength light absorbing agent is T4065, an average transmittance in red visible light region of the second optical lens element 320 including the long-wavelength light absorbing agent is T5870, an average transmittance in green visible light region of the second optical lens element 320 including the long-wavelength light absorbing agent is T5058, and an average transmittance in blue visible light region of the second optical lens element 320 including the long-wavelength light absorbing agent is T4050, the following conditions can be satisfied: 30%≤T7075; T6570≤50%; 50%≤T4065; 50%≤T5870; 75% T5058; and 75%≤T4050.

The third optical lens element 330 with positive refractive power has an object-side surface 331 being convex in a paraxial region thereof and an image-side surface 332 being concave in a paraxial region thereof, and has the object-side surface 331 and the image-side surface 332 being both aspheric. The third optical lens element 330 is made of a plastic material (its reference numeral is omitted), and includes at least one long-wavelength light absorbing agent (its reference numeral is omitted). The long-wavelength light absorbing agent is homogeneously mixed with the plastic material. When a central thickness of the third optical lens element 330 including the long-wavelength light absorbing agent is CT3, the following condition is satisfied: CT3=0.34 mm. When a wavelength correspondent to a 50% transmittance of the third optical lens element 330 including the long-wavelength light absorbing agent is WLT50, the following condition can be satisfied: 550 nm≤WLT50≤700 nm. When a minimum transmittance in infrared region of the third optical lens element 330 including the long-wavelength light absorbing agent is TIRmin, the following condition can be satisfied: TIRmin≤30%. When an average transmittance in a wavelength range of 700 nm-750 nm of the third optical lens element 330 including the long-wavelength light absorbing agent is T7075, an average transmittance in a wavelength range of 650 nm-700 nm of the third optical lens element 330 including the long-wavelength light absorbing agent is T6570, an average transmittance in a wavelength range of 400 nm-650 nm of the third optical lens element 330 including the long-wavelength light absorbing agent is T4065, an average transmittance in red visible light region of the third optical lens element 330 including the long-wavelength light absorbing agent is T5870, an average transmittance in green visible light region of the third optical lens element 330 including the long-wavelength light absorbing agent is T5058, and an average transmittance in blue visible light region of the third optical lens element 330 including the long-wavelength light absorbing agent is T4050, the following conditions can be satisfied: 30%≤T7075; T6570≤50%; 50% T4065; 50%≤T5870; 75%≤T5058; and 75%≤T4050.

In the optical image lens assembly of the 3rd embodiment, when a maximum thickness of the optical lens elements including the long-wavelength light absorbing agent is TKmax, and a minimum thickness of the optical lens elements including the long-wavelength light absorbing agent is TKmin, the following conditions of the first optical lens element 310 are satisfied: TKmax=0.21 mm, TKmin=0.11 mm, and TKmax/TKmin=1.91; the following conditions of the second optical lens element 320 are satisfied: TKmax=0.17 mm, TKmin=0.11 mm, and TKmax/TKmin=1.55; and the following conditions of the third optical lens element 330 are satisfied: TKmax=0.34 mm, TKmin=0.20 mm, and TKmax/TKmin=1.70.

In the optical image lens assembly of the 3rd embodiment, a sum of central thicknesses of the optical lens elements including the long-wavelength light absorbing agent is sumCTa (in the 3rd embodiment, the first optical lens element 310, the second optical lens element 320 and the third optical lens element 330 include the long-wavelength light absorbing agent, that is, sumCTa equals to the central thickness CT1 of the first optical lens element 310 plus the central thickness CT2 of the second optical lens element 320 plus the central thickness CT3 of the third optical lens element 330), a sum of central thicknesses of the optical lens elements is sumCT (in the 3rd embodiment, sumCT equals to the central thickness CT1 of the first optical lens element 310 plus the central thickness CT2 of the second optical lens element 320 plus the central thickness CT3 of the third optical lens element 330), and a maximum of maximum effective diameters of the optical lens elements including the long-wavelength light absorbing agent is ϕ max (in the 3rd embodiment, ϕ max equals to a maximum effective diameter of the third optical lens element 330), the following conditions are satisfied: sumCTa=0.67 mm; sumCT=0.67 mm; ϕ max=1.54 mm; sumCTa/sumCT=1.00; and ϕ max/sumCTa=2.29.

The details of the plastic material and the long-wavelength light absorbing agent have been mentioned above, and are not repeated herein.

4th Embodiment

Figure 4:
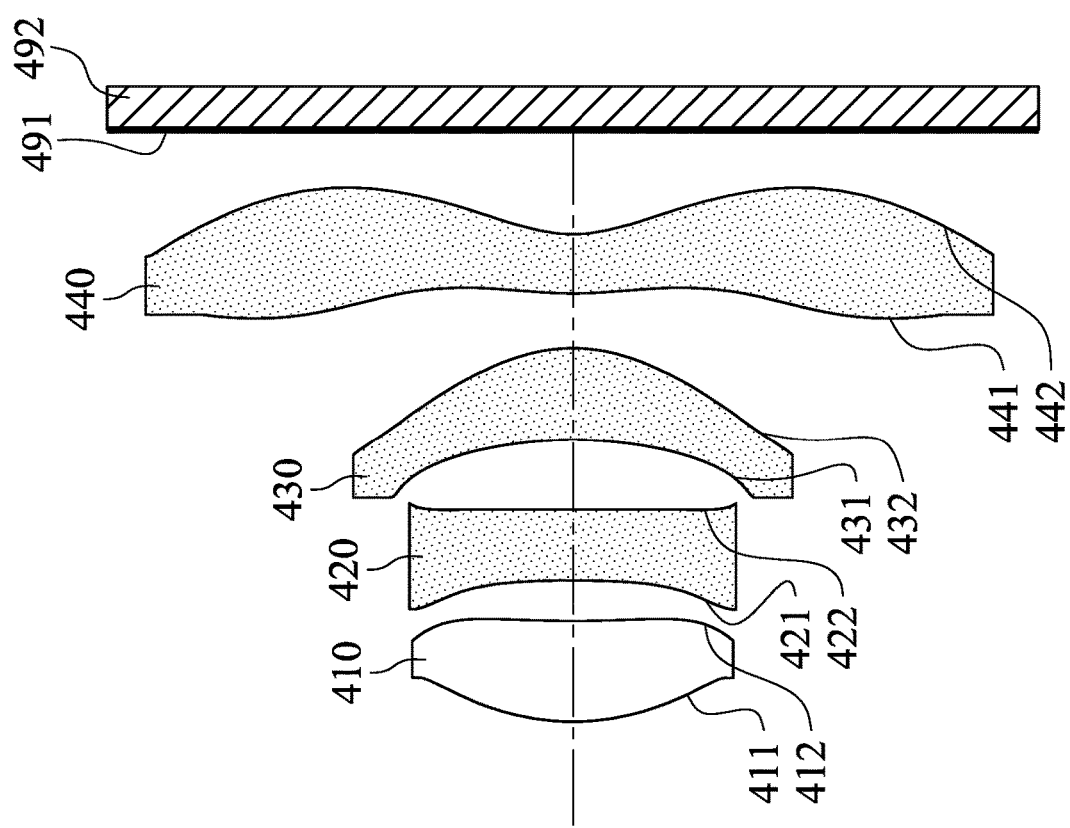
FIG. 4 is a schematic view of an image capturing apparatus according to the 4th embodiment of the present disclosure.

FIG. 4 is a schematic view of an image capturing apparatus according to the 4th embodiment of the present disclosure. In FIG. 4, the image capturing apparatus includes an optical image lens assembly (its reference numeral is omitted) and an image sensor 492. The optical image lens assembly includes, in order from an object side to an image side, a first optical lens element 410, a second optical lens element 420, a third optical lens element 430, a fourth optical lens element 440 and an image surface 491, wherein the image sensor 492 is disposed on the image surface 491 of the optical image lens assembly. The optical image lens assembly can selectively include other elements, such as an aperture stop (not shown). The other elements are not the key points and will not be described herein.

The first optical lens element 410 with positive refractive power has an object-side surface 411 being convex in a paraxial region thereof and an image-side surface 412 being concave in a paraxial region thereof, and has the object-side surface 411 and the image-side surface 412 being both aspheric. When a central thickness of the first optical lens element 410 is CT1, the following condition is satisfied: CT1=0.54 mm.

The second optical lens element 420 with negative refractive power has an object-side surface 421 being concave in a paraxial region thereof and an image-side surface 422 being concave in a paraxial region thereof, and has the object-side surface 421 and the image-side surface 422 being both aspheric. The second optical lens element 420 is made of a plastic material (its reference numeral is omitted), and includes at least one long-wavelength light absorbing agent (its reference numeral is omitted). The long-wavelength light absorbing agent is homogeneously mixed with the plastic material. The second optical lens element 420 is the second optical lens element among the optical lens elements in order from an object side to an image side. When a central thickness of the second optical lens element 420 is CT2, the following condition is satisfied: CT2=0.38 mm. When a wavelength correspondent to a 50% transmittance of the second optical lens element 420 including the long-wavelength light absorbing agent is WLT50, the following condition can be satisfied: 550 nm≤WLT50≤700 nm. When a minimum transmittance in infrared region of the second optical lens element 420 including the long-wavelength light absorbing agent is TIRmin, the following condition can be satisfied: TIRmin≤30%. When an average transmittance in a wavelength range of 700 nm-750 nm of the second optical lens element 420 including the long-wavelength light absorbing agent is T7075, an average transmittance in a wavelength range of 650 nm-700 nm of the second optical lens element 420 including the long-wavelength light absorbing agent is T6570, an average transmittance in a wavelength range of 400 nm-650 nm of the second optical lens element 420 including the long-wavelength light absorbing agent is T4065, an average transmittance in red visible light region of the second optical lens element 420 including the long-wavelength light absorbing agent is T5870, an average transmittance in green visible light region of the second optical lens element 420 including the long-wavelength light absorbing agent is T5058, and an average transmittance in blue visible light region of the second optical lens element 420 including the long-wavelength light absorbing agent is T4050, the following conditions can be satisfied: 30%≤T7075; T6570≤50%; 50%≤T4065; 50%≤T5870; 75%≤T5058; and 75%≤T4050.

The third optical lens element 430 with positive refractive power has an object-side surface 431 being concave in a paraxial region thereof and an image-side surface 432 being convex in a paraxial region thereof, and has the object-side surface 431 and the image-side surface 432 being both aspheric. The third optical lens element 430 is made of a plastic material (its reference numeral is omitted), and includes at least one long-wavelength light absorbing agent (its reference numeral is omitted). The long-wavelength light absorbing to agent is homogeneously mixed with the plastic material. The third optical lens element 430 is the third optical lens element among the optical lens elements in order from an object side to an image side. When a central thickness of the third optical lens element 430 including the long-wavelength light absorbing agent is CT3, the following condition is satisfied: CT3=0.49 mm. When a wavelength correspondent to a 50% transmittance of the third optical lens element 430 including the long-wavelength light absorbing agent is WLT50, the following condition can be satisfied: 550 nm≤WLT50≤700 nm. When a minimum transmittance in infrared region of the third optical lens element 430 including the long-wavelength light absorbing agent is TIRmin, the following condition can be satisfied: TIRmin≤30%. When an average transmittance in a wavelength range of 700 nm-750 nm of the third optical lens element 430 including the long-wavelength light absorbing agent is T7075, an average transmittance in a wavelength range of 650 nm-700 nm of the third optical lens element 430 including the long-wavelength light absorbing agent is T6570, an average transmittance in a wavelength range of 400 nm-650 nm of the third optical lens element 430 including the long-wavelength light absorbing agent is T4065, an average transmittance in red visible light region of the third optical lens element 430 including the long-wavelength light absorbing agent is T5870, an average transmittance in green visible light region of the third optical lens element 430 including the long-wavelength light absorbing agent is T5058, and an average transmittance in blue visible light region of the third optical lens element 430 including the long-wavelength light absorbing agent is T4050, the following conditions can be satisfied: 30%≤T7075; T6570≤50%; 50%≤T4065; 50%≤T5870; 75%≤T5058; and 75%≤T4050.

The fourth optical lens element 440 with negative refractive power has an object-side surface 441 being convex in a paraxial region thereof and an image-side surface 442 being concave in a paraxial region thereof, and has the object-side surface 441 and the image-side surface 442 being both aspheric. The fourth optical lens element 440 is made of a plastic material (its reference numeral is omitted), and includes at least one long-wavelength light absorbing agent (its reference numeral is omitted). The long-wavelength light absorbing agent is homogeneously mixed with the plastic material. When a central thickness of the fourth optical lens element 440 including the long-wavelength light absorbing agent is CT4, the following condition is satisfied: CT4=0.32 mm. When a wavelength correspondent to a 50% transmittance of the fourth optical lens element 440 including the long-wavelength light absorbing agent is WLT50, the following condition can be satisfied: 550 nm≤WLT50≤700 nm. When a minimum transmittance in infrared region of the fourth optical lens element 440 including the long-wavelength light absorbing agent is TIRmin, the following condition can be satisfied: TIRmin≤30%. When an average transmittance in a wavelength range of 700 nm-750 nm of the fourth optical lens element 440 including the long-wavelength light absorbing agent is T7075, an average transmittance in a wavelength range of 650 nm-700 nm of the fourth optical lens element 440 including the long-wavelength light absorbing agent is T6570, an average transmittance in a wavelength range of 400 nm-650 nm of the fourth optical lens element 440 including the long-wavelength light absorbing agent is T4065, an average transmittance in red visible light region of the fourth optical lens element 440 including the long-wavelength light absorbing agent is T5870, an average transmittance in green visible light region of the fourth optical lens element 440 including the long-wavelength light absorbing agent is T5058, and an average transmittance in blue visible light region of the fourth optical lens element 440 including the long-wavelength light absorbing agent is T4050, the following conditions can be satisfied: 30%≤T7075; T6570≤50%; 50%≤T4065; 50%≤T5870; 75%≤T5058; and 75%≤T4050.

In the optical image lens assembly of the 4th embodiment, when a maximum thickness of the optical lens elements including the long-wavelength light absorbing agent is TKmax, and a minimum thickness of the optical lens elements including the long-wavelength light absorbing agent is TKmin, the following conditions of the second optical lens element 420 are satisfied: TKmax=0.57 mm, TKmin=0.38 mm, and TKmax/TKmin=1.50; the following conditions of the third optical lens element 430 are satisfied: TKmax=0.49 mm, TKmin=0.23 mm, and TKmax/TKmin=2.13; and the following conditions of the fourth optical lens element 440 are satisfied: TKmax=0.66 mm, TKmin=0.32 mm, and TKmax/TKmin=2.06.

In the optical image lens assembly of the 4th embodiment, a sum of central thicknesses of the optical lens elements including the long-wavelength light absorbing agent is sumCTa (in the 4th embodiment, the second optical lens element 420, the third optical lens element 430 and the fourth optical lens element 440 include the long-wavelength light absorbing agent, that is, sumCTa equals to the central thickness CT2 of the second optical lens element 420 plus the central thickness CT3 of the third optical lens element 430 plus the central thickness CT4 of the fourth optical lens element 440), a sum of central thicknesses of the optical lens elements is sumCT (in the 4th embodiment, sumCT equals to the central thickness CT1 of the first optical lens element 410 plus the central thickness CT2 of the second optical lens element 420 plus the central thickness CT3 of the third optical lens element 430 plus the central thickness CT4 of the fourth optical lens element 440), and a maximum of maximum effective diameters of the optical lens elements including the long-wavelength light absorbing agent is φ max (in the 4th embodiment, φ max equals to a maximum effective diameter of the fourth optical lens element 440), the following conditions are satisfied: sumCTa=1.19 mm; sumCT=1.73 mm; φ max=4.58 mm; sumCTa/sumCT=0.69; and φ max/sumCTa=3.85.

The details of the plastic material and the long-wavelength light absorbing agent have been mentioned above, and are not repeated herein.

5th Embodiment

Figure 5:
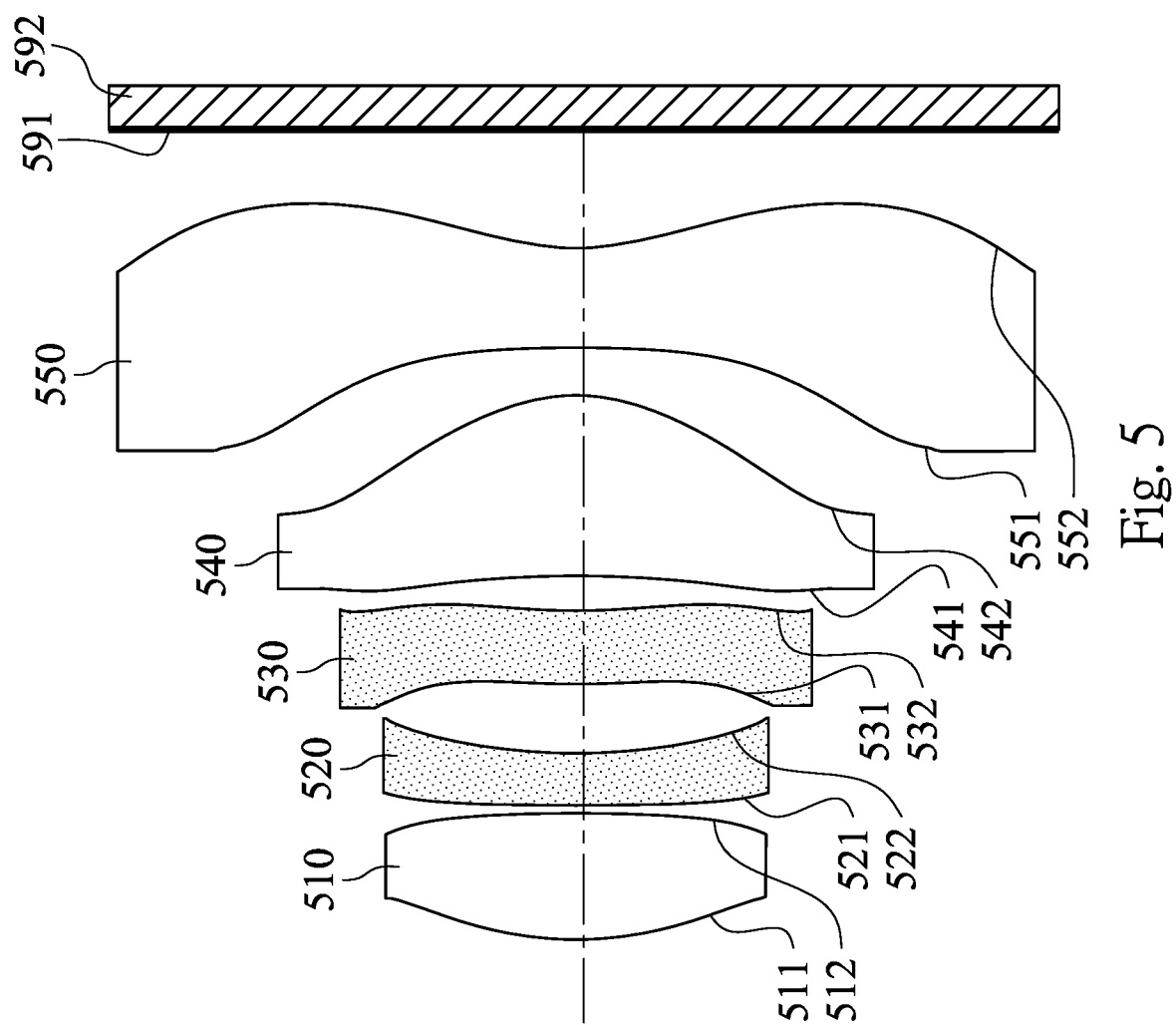
FIG. 5 is a schematic view of an image capturing apparatus according to the 5th embodiment of the present disclosure.

FIG. 5 is a schematic view of an image capturing apparatus according to the 5th embodiment of the present disclosure. In FIG. 5, the image capturing apparatus includes an optical image lens assembly (its reference numeral is omitted) and an image sensor 592. The optical image lens assembly includes, in order from an object side to an image side, a first optical lens element 510, a second optical lens element 520, a third optical lens element 530, a fourth optical lens element 540, a fifth optical lens element 550 and an image surface 591, wherein the image sensor 592 is disposed on the image surface 591 of the optical image lens assembly. The optical image lens assembly can selectively include other elements, such as an aperture stop (not shown). The other elements are not the key points and will not be described herein.

The first optical lens element 510 with positive refractive power has an object-side surface 511 being convex in a paraxial region thereof and an image-side surface 512 being convex in a paraxial region thereof, and has the object-side surface 511 and the image-side surface 512 being both aspheric. When a central thickness of the first optical lens element 510 is CT1, the following condition is satisfied: CT1=1.37 mm.

The second optical lens element 520 with negative refractive power has an object-side surface 521 being convex in a paraxial region thereof and an image-side surface 522 being concave in a paraxial region thereof, and has the object-side surface 521 and the image-side surface 522 being both aspheric. The second optical lens element 520 is made of a plastic material (its reference numeral is omitted), and includes at least one long-wavelength light absorbing agent (its reference numeral is omitted). The long-wavelength light absorbing agent is homogeneously mixed with the plastic material. The second optical lens element 520 is the second optical lens element among the optical lens elements in order from an object side to an image side. When a central thickness of the second optical lens element 520 including the long-wavelength light absorbing agent is CT2, the following condition is satisfied: CT2=0.57 mm. When a wavelength correspondent to a 50% transmittance of the second optical lens element 520 including the long-wavelength light absorbing agent is WLT50, the following condition can be satisfied: 550 nm≤WLT50≤700 nm. When a minimum transmittance in infrared region of the second optical lens element 520 including the long-wavelength light absorbing agent is TIRmin, the following condition can be satisfied: TIRmin≤30%. When an average transmittance in a wavelength range of 700 nm-750 nm of the second optical lens element 520 including the long-wavelength light absorbing agent is T7075, an average transmittance in a wavelength range of 650 nm-700 nm of the second optical lens element 520 including the long-wavelength light absorbing agent is T6570, an average transmittance in a wavelength range of 400 nm-650 nm of the second optical lens element 520 including the long-wavelength light absorbing agent is T4065, an average transmittance in red visible light region of the second optical lens element 520 including the long-wavelength light absorbing agent is T5870, an average transmittance in green visible light region of the second optical lens element 520 including the long-wavelength light absorbing agent is T5058, and an average transmittance in blue visible light region of the second optical lens element 520 including the long-wavelength light absorbing agent is T4050, the following conditions can be satisfied: 30%≤T7075; T6570≤50%; 50%≤T4065; 50%≤T5870; 75%≤T5058; and 75%≤T4050.

The third optical lens element 530 with negative refractive power has an object-side surface 531 being convex in a paraxial region thereof and an image-side surface 532 being concave in a paraxial region thereof, and has the object-side surface 531 and the image-side surface 532 being both aspheric. The third optical lens element 530 is made of a plastic material (its reference numeral is omitted), and includes at least one long-wavelength light absorbing agent (its reference numeral is omitted). The long-wavelength light absorbing agent is homogeneously mixed with the plastic material. The third optical lens element 530 is the third optical lens element among the optical lens elements in order from an object side to an image side. When a central thickness of the third optical lens element 530 is CT3, the following condition is satisfied: CT3=0.80 mm. When a wavelength correspondent to a 50% transmittance of the third optical lens element 530 including the long-wavelength light absorbing agent is WLT50, the following condition can be satisfied: 550 nm≤WLT50≤700 nm. When a minimum transmittance in infrared region of the third optical lens element 530 including the long-wavelength light absorbing agent is TIRmin, the following condition can be satisfied: TIRmin≤30%. When an average transmittance in a wavelength range of 700 nm-750 nm of the third optical lens element 530 including the long-wavelength light absorbing agent is T7075, an average transmittance in a wavelength range of 650 nm-700 nm of the third optical lens element 530 including the long-wavelength light absorbing agent is T6570, an average transmittance in a wavelength range of 400 nm-650 nm of the third optical lens element 530 including the long-wavelength light absorbing agent is T4065, an average transmittance in red visible light region of the third optical lens element 530 including the long-wavelength light absorbing agent is T5870, an average transmittance in green visible light region of the third optical lens element 530 including the long-wavelength light absorbing agent is T5058, and an average transmittance in blue visible light region of the third optical lens element 530 including the long-wavelength light absorbing agent is T4050, the following conditions can be satisfied: 30%≤T7075; T6570≤50%; 50%≤T4065; 50%≤T5870; 75%≤T5058; and 75%≤T4050.

The fourth optical lens element 540 with positive refractive power has an object-side surface 541 being concave in a paraxial region thereof and an image-side surface 542 being convex in a paraxial region thereof, and has the object-side surface 541 and the image-side surface 542 being both aspheric. When a central thickness of the fourth optical lens element 540 is CT4, the following condition is satisfied: CT4=1.96 mm.

The fifth optical lens element 550 with negative refractive power has an object-side surface 551 being concave in a paraxial region thereof and an image-side surface 552 being concave in a paraxial region thereof, and has the object-side surface 551 and the image-side surface 552 being both aspheric. When a central thickness of the fifth optical lens element 550 is CT5, the following condition is satisfied: CT5=1.08 mm.

In the optical image lens assembly of the 5th embodiment, when a maximum thickness of the optical lens elements including the long-wavelength light absorbing agent is TKmax, a minimum thickness of the optical lens elements including the long-wavelength light absorbing agent is TKmin, the following conditions of the second optical lens element 520 are satisfied: TKmax=0.81 mm, TKmin=0.57 mm, and TKmax/TKmin=1.42; and the following conditions of the third optical lens element 530 are satisfied: TKmax=1.07 mm, TKmin=0.80 mm, and TKmax/TKmin=1.34.

In the optical image lens assembly of the 5th embodiment, a sum of central thicknesses of the optical lens elements including the long-wavelength light absorbing agent is sumCTa (in the 5th embodiment, both of the second optical lens element 520 and the third optical lens element 530 include the long-wavelength light absorbing agent, that is, sumCTa equals to the central thickness CT2 of the second optical lens element 520 plus the central thickness CT3 of the third optical lens element 530), a sum of central thicknesses of the optical lens elements is sumCT (in the 5th embodiment, sumCT equals to the central thickness CT1 of the first optical lens element 510 plus the central thickness CT2 of the second optical lens element 520 plus the central thickness CT3 of the third optical lens element 530 plus the central thickness CT4 of the fourth optical lens element 540 plus the central thickness CT5 of the fifth optical lens element 550), and a maximum of maximum effective diameters of the optical lens elements including the long-wavelength light absorbing agent is φ max (in the 5th embodiment, φ max equals to a maximum effective diameter of the fifth optical lens element 550), the following conditions are satisfied: sumCTa=1.37 mm; sumCT=5.77 mm; φ max=5.30 mm; sumCTa/sumCT=0.24; and φ max/sumCTa=3.88.

The details of the plastic material and the long-wavelength light absorbing agent have been mentioned above, and are not repeated herein.

6th Embodiment

Figure 6:
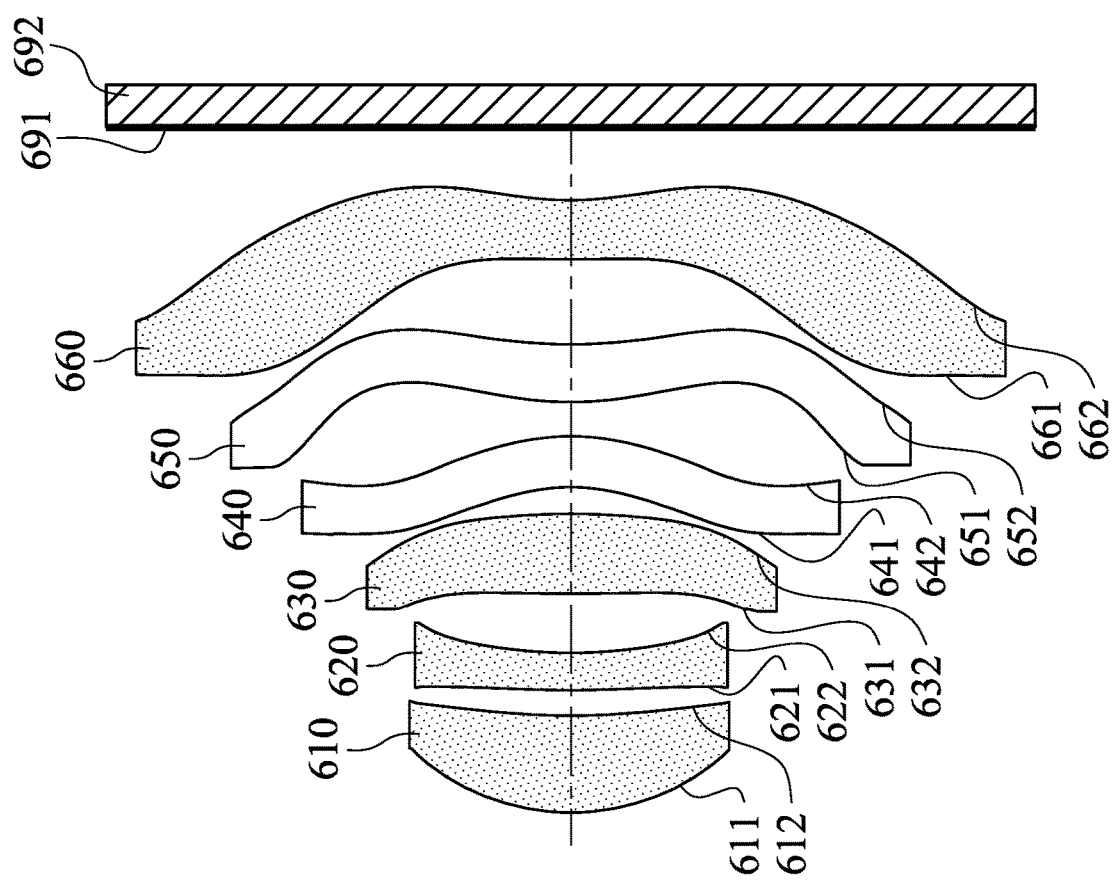
FIG. 6 is a schematic view of an image capturing apparatus according to the 6th embodiment of the present disclosure.

FIG. 6 is a schematic view of an image capturing apparatus according to the 6th embodiment of the present disclosure. In FIG. 6, the image capturing apparatus includes an optical image lens assembly (its reference numeral is omitted) and an image sensor 692. The optical image lens assembly includes, in order from an object side to an image side, a first optical lens element 610, a second optical lens element 620, a third optical lens element 630, a fourth optical lens element 640, a fifth optical lens element 650, a sixth optical lens element 660 and an image surface 691, wherein the image sensor 692 is disposed on the image surface 691 of the optical image lens assembly. The optical image lens assembly can selectively include other elements, such as an aperture stop (not shown). The other elements are not the key points and will not be described herein.

The first optical lens element 610 with positive refractive power has an object-side surface 611 being convex in a paraxial region thereof and an image-side surface 612 being concave in a paraxial region thereof, and has the object-side surface 611 and the image-side surface 612 being both aspheric. The first optical lens element 610 is made of a plastic material (its reference numeral is omitted), and includes at least one long-wavelength light absorbing agent (its reference numeral is omitted). The long-wavelength light absorbing agent is homogeneously mixed with the plastic material. When a central thickness of the first optical lens element 610 including the long-wavelength light absorbing agent is CT1, the following condition is satisfied: CT1=0.57 mm. When a wavelength correspondent to a 50% transmittance of the first optical lens element 610 including the long-wavelength light absorbing agent is WLT50, the following condition can be satisfied: 550 nm≤WLT50≤700 nm. When a minimum transmittance in infrared region of the first optical lens element 610 including the long-wavelength light absorbing agent is TIRmin, the following condition can be satisfied: TIRmin≤30%. When an average transmittance in a wavelength range of 700 nm-750 nm of the first optical lens element 610 including the long-wavelength light absorbing agent is T7075, an average transmittance in a wavelength range of 650 nm-700 nm of the first optical lens element 610 including the long-wavelength light absorbing agent is T6570, an average transmittance in a wavelength range of 400 nm-650 nm of the first optical lens element 610 including the long-wavelength light absorbing agent is T4065, an average transmittance in red visible light region of the first optical lens element 610 including the long-wavelength light absorbing agent is T5870, an average transmittance in green visible light region of the first optical lens element 610 including the long-wavelength light absorbing agent is T5058, and an average transmittance in blue visible light region of the first optical lens element 610 including the long-wavelength light absorbing agent is T4050, the following conditions can be satisfied: 30%≤T7075; T6570≤50%; 50%≤T4065; 50%≤T5870; 75%≤T5058; and 75%≤T4050.

The second optical lens element 620 with negative refractive power has an object-side surface 621 being convex in a paraxial region thereof and an image-side surface 622 being concave in a paraxial region thereof, and has the object-side surface 621 and the image-side surface 622 being both aspheric. The second optical lens element 620 is made of a plastic material (its reference numeral is omitted), and includes at least one long-wavelength light absorbing agent (its reference numeral is omitted). The long-wavelength light absorbing agent is homogeneously mixed with the plastic material. The second optical lens element 620 is the second optical lens element among the optical lens elements in order from an object side to an image side. When a central thickness of the second optical lens element 620 is CT2, the following condition is satisfied: CT2=0.22 mm. When a wavelength correspondent to a 50% transmittance of the second optical lens element 620 including the long-wavelength light absorbing agent is WLT50, the following condition can be satisfied: 550 nm≤WLT50≤700 nm. When a minimum transmittance in infrared region of the second optical lens element 620 including the long-wavelength light absorbing agent is TIRmin, the following condition can be satisfied: TIRmin≤30%. When an average transmittance in a wavelength range of 700 nm-750 nm of the second optical lens element 620 including the long-wavelength light absorbing agent is T7075, an average transmittance in a wavelength range of 650 nm-700 nm of the second optical lens element 620 including the long-wavelength light absorbing agent is T6570, an average transmittance in a wavelength range of 400 nm-650 nm of the second optical lens element 620 including the long-wavelength light absorbing agent is T4065, an average transmittance in red visible light region of the second optical lens element 620 including the long-wavelength light absorbing agent is T5870, an average transmittance in green visible light region of the second optical lens element 620 including the long-wavelength light absorbing agent is T5058, and an average transmittance in blue visible light region of the second optical lens element 620 including the long-wavelength light absorbing agent is T4050, the following conditions can be satisfied: 30%≤T7075; T6570≤50%; 50%≤T4065; 50%≤T5870; 75%≤T5058; and 75%≤T4050.

The third optical lens element 630 with positive refractive power has an object-side surface 631 being convex in a paraxial region thereof and an image-side surface 632 being convex in a paraxial region thereof, and has the object-side surface 631 and the image-side surface 632 being both aspheric. The third optical lens element 630 is made of a plastic material (its reference numeral is omitted), and includes at least one long-wavelength light absorbing agent (its reference numeral is omitted). The long-wavelength light absorbing agent is homogeneously mixed with the plastic material. The third optical lens element 630 is the third optical lens element among the optical lens elements in order from an object side to an image side. When a central thickness of the third optical lens element 630 is CT3, the following condition is satisfied: CT3=0.47 mm. When a wavelength correspondent to a 50% transmittance of the third optical lens element 630 including the long-wavelength light absorbing agent is WLT50, the following condition can be satisfied: 550 nm≤WLT50≤700 nm. When a minimum transmittance in infrared region of the third optical lens element 630 including the long-wavelength light absorbing agent is TIRmin, the following condition can be satisfied: TIRmin≤30%. When an average transmittance in a wavelength range of 700 nm-750 nm of the third optical lens element 630 including the long-wavelength light absorbing agent is T7075, an average transmittance in a wavelength range of 650 nm-700 nm of the third optical lens element 630 including the long-wavelength light absorbing agent is T6570, an average transmittance in a wavelength range of 400 nm-650 nm of the third optical lens element 630 including the long-wavelength light absorbing agent is T4065, an average transmittance in red visible light region of the third optical lens element 630 including the long-wavelength light absorbing agent is T5870, an average transmittance in green visible light region of the third optical lens element 630 including the long-wavelength light absorbing agent is T5058, and an average transmittance in blue visible light region of the third optical lens element 630 including the long-wavelength light absorbing agent is T4050, the following conditions can be satisfied: 30%≤T7075; T6570≤50%; 50%≤T4065; 50%≤T5870; 75%≤T5058; and 75%≤T4050.

The fourth optical lens element 640 with negative refractive power has an object-side surface 641 being concave in a paraxial region thereof and an image-side surface 642 being convex in a paraxial region thereof, and has the object-side surface 641 and the image-side surface 642 being both aspheric. When a central thickness of the fourth optical lens element 640 is CT4, the following condition is satisfied: CT4=0.30 mm.

The fifth optical lens element 650 with positive refractive power has an object-side surface 651 being convex in a paraxial region thereof and an image-side surface 652 being concave in a paraxial region thereof, and has the object-side surface 651 and the image-side surface 652 being both aspheric. When a central thickness of the fifth optical lens element 650 is CT5, the following condition is satisfied: CT5=0.34 mm.

The sixth optical lens element 660 with negative refractive power has an object-side surface 661 being concave in a paraxial region thereof and an image-side surface 662 being concave in a paraxial region thereof, and has the object-side surface 661 and the image-side surface 662 being both aspheric. The sixth optical lens element 660 is made of a plastic material (its reference numeral is omitted), and includes at least one long-wavelength light absorbing agent (its reference numeral is omitted). The long-wavelength light absorbing agent is homogeneously mixed with the plastic material. When a central thickness of the sixth optical lens element 660 including the long-wavelength light absorbing agent is CT6, the following condition is satisfied: CT6=0.35 mm. When a wavelength correspondent to a 50% transmittance of the sixth optical lens element 660 including the long-wavelength light absorbing agent is WLT50, the following condition can be satisfied: 550 nm≤WLT50≤700 nm. When a minimum transmittance in infrared region of the sixth optical lens element 660 including the long-wavelength light absorbing agent is TIRmin, the following condition can be satisfied: TIRmin≤30%. When an average transmittance in a wavelength range of 700 nm-750 nm of the sixth optical lens element 660 including the long-wavelength light absorbing agent is T7075, an average transmittance in a wavelength range of 660 nm-700 nm of the sixth optical lens element 660 including the long-wavelength light absorbing agent is T6570, an average transmittance in a wavelength range of 400 nm-650 nm of the sixth optical lens element 660 including the long-wavelength light absorbing agent is T4065, an average transmittance in red visible light region of the sixth optical lens element 660 including the long-wavelength light absorbing agent is T5870, an average transmittance in green visible light region of the sixth optical lens element 660 including the long-wavelength light absorbing agent is T5058, and an average transmittance in blue visible light region of the sixth optical lens element 660 including the long-wavelength light absorbing agent is T4050, the following conditions can be satisfied: 30%≤T7075; T6570≤50%; 50%≤T4065; 50%≤T5870; 75%≤T5058; and 75%≤T4050.

In the optical image lens assembly of the 6th embodiment, when a maximum thickness of the optical lens elements including the long-wavelength light absorbing agent is TKmax, and a minimum thickness of the optical lens elements including the long-wavelength light absorbing agent is TKmin, the following conditions of the first optical lens element 610 are satisfied: TKmax=0.57 mm, TKmin=0.28 mm, and TKmax/TKmin=2.04; the following conditions of the second optical lens element 620 are satisfied: TKmax=0.38 mm, TKmin=0.22 mm, and TKmax/TKmin=1.73, the following conditions of the third optical lens element 630 are satisfied: TKmax=0.47 mm, TKmin=0.25 mm, and TKmax/TKmin=1.88, and the following conditions of the sixth optical lens element 660 are satisfied: TKmax=0.81 mm, TKmin=0.35 mm, and TKmax/TKmin=2.31.

In the optical image lens assembly of the 6th embodiment, a sum of central thicknesses of the optical lens elements including the long-wavelength light absorbing agent is sumCTa (in the 6th embodiment, the first optical lens element 610, the second optical lens element 620, the third optical lens element 630, and the sixth optical lens element 660 include the long-wavelength light absorbing agent, that is, sumCTa equals to the central thickness CT1 of the first optical lens element 610 plus the central thickness CT2 of the second optical lens element 620 plus the central thickness CT3 of the third optical lens element 630 plus the central thickness CT6 of the sixth optical lens element 660), a sum of central thicknesses of the optical lens elements is sumCT (in the 6th embodiment, sumCT equals to the central thickness CT1 of the first optical lens element 610 plus the central thickness CT2 of the second optical lens element 620 plus the central thickness CT3 of the third optical lens element 630 plus the central thickness CT4 of the fourth optical lens element 640 plus the central thickness CT5 of the fifth optical lens element 650 plus the central thickness CT6 of the sixth optical lens element 660), and a maximum of maximum effective diameters of the optical lens elements including the long-wavelength light absorbing agent is ϕ max (in the 6th embodiment, ϕ max equals to a maximum effective diameter of the sixth optical lens element 660), the following conditions are satisfied: sumCTa=1.61 mm; sumCT=2.25 mm; ϕ max=5.12 mm; sumCTa/sumCT=0.72; and ϕ max/sumCTa=3.18.

The details of the plastic material and the long-wavelength light absorbing agent have been mentioned above, and are not repeated herein.

7th Embodiment

Figure 7:
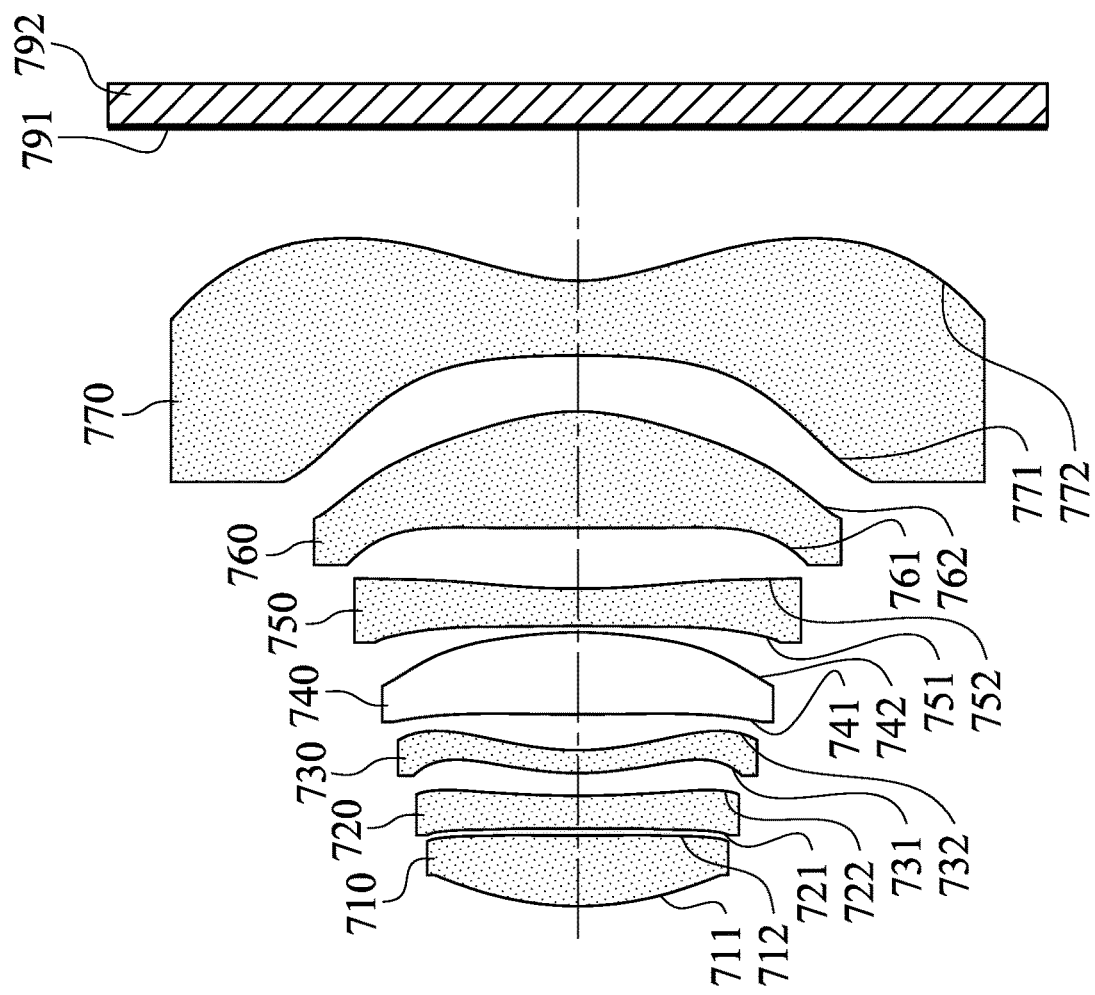
FIG. 7 is a schematic view of an image capturing apparatus according to the 7th embodiment of the present disclosure.

FIG. 7 is a schematic view of an image capturing apparatus according to the 7th embodiment of the present disclosure. In FIG. 7, the image capturing apparatus includes an optical image lens assembly (its reference numeral is omitted) and an image sensor 792. The optical image lens assembly includes, in order from an object side to an image side, a first optical lens element 710, a second optical lens element 720, a third optical lens element 730, a fourth optical lens element 740, a fifth optical lens element 750, a sixth optical lens element 760, a seventh optical lens element 770 and an image surface 791, wherein the image sensor 792 is disposed on the image surface 791 of the optical image lens assembly. The optical image lens assembly can selectively include other elements, such as an aperture stop (not shown). The other elements are not the key points and will not be described herein.

The first optical lens element 710 with positive refractive power has an object-side surface 711 being convex in a paraxial region thereof and an image-side surface 712 being concave in a paraxial region thereof, and has the object-side surface 711 and the image-side surface 712 being both aspheric. The first optical lens element 710 is made of a plastic material (its reference numeral is omitted), and includes at least one long-wavelength light absorbing agent (its reference numeral is omitted). The long-wavelength light absorbing agent is homogeneously mixed with the plastic material. When a central thickness of the first optical lens element 710 including the long-wavelength light absorbing agent is CT1, the following condition is satisfied: CT1=0.77 mm. When a wavelength correspondent to a 50% transmittance of the first optical lens element 710 including the long-wavelength light absorbing agent is WLT50, the following condition can be satisfied: 550 nm≤WLT50≤700 nm. When a minimum transmittance in infrared region of the first optical lens element 710 including the long-wavelength light absorbing agent is TIRmin, the following condition can be satisfied: TIRmin≤30%. When an average transmittance in a wavelength range of 700 nm-750 nm of the first optical lens element 710 including the long-wavelength light absorbing agent is T7075, an average transmittance in a wavelength range of 650 nm-700 nm of the first optical lens element 710 including the long-wavelength light absorbing agent is T6570, an average transmittance in a wavelength range of 400 nm-650 nm of the first optical lens element 710 including the long-wavelength light absorbing agent is T4065, an average transmittance in red visible light region of the first optical lens element 710 including the long-wavelength light absorbing agent is T5870, an average transmittance in green visible light region of the first optical lens element 710 including the long-wavelength light absorbing agent is T5058, and an average transmittance in blue visible light region of the first optical lens element 710 including the long-wavelength light absorbing agent is T4050, the following conditions can be satisfied: 30%≤T7075; T6570≤50%; 50% T4065; 50%≤T5870; 75%≤T5058; and 75%≤T4050.

The second optical lens element 720 with negative refractive power has an object-side surface 721 being concave in a paraxial region thereof and an image-side surface 722 being concave in a paraxial region thereof, and has the object-side surface 721 and the image-side surface 722 being both aspheric. The second optical lens element 720 is made of a plastic material (its reference numeral is omitted), and includes at least one long-wavelength light absorbing agent (its reference numeral is omitted). The long-wavelength light absorbing agent is homogeneously mixed with the plastic material. The second optical lens element 720 is the second optical lens element among the optical lens elements in order from an object side to an image side. When a central thickness of the second optical lens element 720 is CT2, the following condition is satisfied: CT2=0.37 mm. When a wavelength correspondent to a 50% transmittance of the second optical lens element 720 including the long-wavelength light absorbing agent is WLT50, the following condition can be satisfied: 550 nm≤WLT50≤700 nm. When a minimum transmittance in infrared region of the second optical lens element 720 including the long-wavelength light absorbing agent is TIRmin, the following condition can be satisfied: TIRmin≤30%. When an average transmittance in a wavelength range of 700 nm-750 nm of the second optical lens element 720 including the long-wavelength light absorbing agent is T7075, an average transmittance in a wavelength range of 650 nm-700 nm of the second optical lens element 720 including the long-wavelength light absorbing agent is T6570, an average transmittance in a wavelength range of 400 nm-650 nm of the second optical lens element 720 including the long-wavelength light absorbing agent is T4065, an average transmittance in red visible light region of the second optical lens element 720 including the long-wavelength light absorbing agent is T5870, an average transmittance in green visible light region of the second optical lens element 720 including the long-wavelength light absorbing agent is T5058, and an average transmittance in blue visible light region of the second optical lens element 720 including the long-wavelength light absorbing agent is T4050, the following conditions can be satisfied: 30%≤T7075; T6570≤50%; 50%≤T4065; 50%≤T5870; 75%≤T5058; and 75%≤T4050.

The third optical lens element 730 with negative refractive power has an object-side surface 731 being convex in a paraxial region thereof and an image-side surface 732 being concave in a paraxial region thereof, and has the object-side surface 731 and the image-side surface 732 being both aspheric. The third optical lens element 730 is made of a plastic material (its reference numeral is omitted), and includes at least one long-wavelength light absorbing to agent (its reference numeral is omitted). The long-wavelength light absorbing agent is homogeneously mixed with the plastic material. The third optical lens element 730 is the third optical lens element among the optical lens elements in order from an object side to an image side. When a central thickness of the third optical lens element 730 including the long-wavelength light absorbing agent is CT3, the following condition is satisfied: CT3=0.25 mm. When a wavelength correspondent to a 50% transmittance of the third optical lens element 730 including the long-wavelength light absorbing agent is WLT50, the following condition can be satisfied: 550 nm≤WLT50≤700 nm. When a minimum transmittance in infrared region of the third optical lens element 730 including the long-wavelength light absorbing agent is TIRmin, the following condition can be satisfied: TIRmin≤30%. When an average transmittance in a wavelength range of 700 nm-750 nm of the third optical lens element 730 including the long-wavelength light absorbing agent is T7075, an average transmittance in a wavelength range of 650 nm-700 nm of the third optical lens element 730 including the long-wavelength light absorbing agent is T6570, an average transmittance in a wavelength range of 400 nm-650 nm of the third optical lens element 730 including the long-wavelength light absorbing agent is T4065, an average transmittance in red visible light region of the third optical lens element 730 including the long-wavelength light absorbing agent is T5870, an average transmittance in green visible light region of the third optical lens element 730 including the long-wavelength light absorbing agent is T5058, and an average transmittance in blue visible light region of the third optical lens element 730 including the long-wavelength light absorbing agent is T4050, the following conditions can be satisfied: 30%≤T7075; T6570≤50%; 50%≤T4065; 50%≤T5870; 75%≤T5058; and 75%≤T4050.

The fourth optical lens element 740 with positive refractive power has an object-side surface 741 being convex in a paraxial region thereof and an image-side surface 742 being convex in a paraxial region thereof, and has the object-side surface 741 and the image-side surface 742 being both aspheric. When a central thickness of the fourth optical lens element 740 is CT4, the following condition is satisfied: CT4=0.25 mm.

The fifth optical lens element 750 with negative refractive power has an object-side surface 751 being convex in a paraxial region thereof and an image-side surface 752 being concave in a paraxial region thereof, and has the object-side surface 751 and the image-side surface 752 being both aspheric. The fifth optical lens element 750 is made of a plastic material (its reference numeral is omitted), and includes at least one long-wavelength light absorbing agent (its reference numeral is omitted). The long-wavelength light absorbing agent is homogeneously mixed with the plastic material. When a central thickness of the fifth optical lens element 750 including the long-wavelength light absorbing agent is CT5, the following condition is satisfied: CT5=0.41 mm. When a wavelength correspondent to a 50% transmittance of the fifth optical lens element 750 including the long-wavelength light absorbing agent is WLT50, the following condition can be satisfied: 550 nm≤WLT50≤700 nm. When a minimum transmittance in infrared region of the fifth optical lens element 750 including the long-wavelength light absorbing agent is TIRmin, the following condition can be satisfied: TIRmin≤30%. When an average transmittance in a wavelength range of 700 nm-750 nm of the fifth optical lens element 750 including the long-wavelength light absorbing agent is T7075, an average transmittance in a wavelength range of 650 nm-700 nm of the fifth optical lens element 750 including the long-wavelength light absorbing agent is T6570, an average transmittance in a wavelength range of 400 nm-650 nm of the fifth optical lens element 750 including the long-wavelength light absorbing agent is T4065, an average transmittance in red visible light region of the fifth optical lens element 750 including the long-wavelength light absorbing agent is T5870, an average transmittance in green visible light region of the fifth optical lens element 750 including the long-wavelength light absorbing agent is T5058, and an average transmittance in blue visible light region of the fifth optical lens element 750 including the long-wavelength light absorbing agent is T4050, the following conditions can be satisfied: 30%≤T7075; T6570≤50%; 50%≤T4065; 50%≤T5870; 75%≤T5058; and 75%≤T4050.

The sixth optical lens element 760 with positive refractive power has an object-side surface 761 being convex in a paraxial region thereof and an image-side surface 762 being convex in a paraxial region thereof, and has the object-side surface 761 and the image-side surface 762 being both aspheric. The sixth optical lens element 760 is made of a plastic material (its reference numeral is omitted), and includes at least one long-wavelength light absorbing agent (its reference numeral is omitted). The long-wavelength light absorbing agent is homogeneously mixed with the plastic material. When a central thickness of the sixth optical lens element 760 including the long-wavelength light absorbing agent is CT6, the following condition is satisfied: CT6=1.29 mm. When a wavelength correspondent to a 50% transmittance of the sixth optical lens element 760 including the long-wavelength light absorbing agent is WLT50, the following condition can be satisfied: 550 nm≤WLT50≤700 nm. When a minimum transmittance in infrared region of the sixth optical lens element 760 including the long-wavelength light absorbing agent is TIRmin, the following condition can be satisfied: TIRmin≤30%. When an average transmittance in a wavelength range of 700 nm-750 nm of the sixth optical lens element 760 including the long-wavelength light absorbing agent is T7075, an average transmittance in a wavelength range of 650 nm-700 nm of the sixth optical lens element 760 including the long-wavelength light absorbing agent is T6570, an average transmittance in a wavelength range of 400 nm-650 nm of the sixth optical lens element 760 including the long-wavelength light absorbing agent is T4065, an average transmittance in red visible light region of the sixth optical lens element 760 including the long-wavelength light absorbing agent is T5870, an average transmittance in green visible light region of the sixth optical lens element 760 including the long-wavelength light absorbing agent is T5058, and an average transmittance in blue visible light region of the sixth optical lens element 760 including the long-wavelength light absorbing agent is T4050, the following conditions can be satisfied: 30%≤T7075; T6570≤50%; 50%≤T4065; 50%≤T5870; 75%≤T5058; and 75%≤T4050.

The seventh optical lens element 770 with negative refractive power has an object-side surface 771 being concave in a paraxial region thereof and an image-side surface 772 being concave in a paraxial region thereof, and has the object-side surface 771 and the image-side surface 772 being both aspheric. The seventh optical lens element 770 is made of a plastic material (its reference numeral is omitted), and includes at least one long-wavelength light absorbing agent (its reference numeral is omitted). The long-wavelength light absorbing to agent is homogeneously mixed with the plastic material. When a central thickness of the seventh optical lens element 770 including the long-wavelength light absorbing agent is CT7, the following condition is satisfied: CT7=0.82 mm. When a wavelength correspondent to a 50% transmittance of the seventh optical lens element 770 including the long-wavelength light absorbing agent is WLT50, the following condition can be satisfied: 550 nm≤WLT50≤700 nm. When a minimum transmittance in infrared region of the seventh optical lens element 770 including the long-wavelength light absorbing agent is TIRmin, the following condition can be satisfied: TIRmin≤30%. When an average transmittance in a wavelength range of 700 nm-750 nm of the seventh optical lens element 770 including the long-wavelength light absorbing agent is T7075, an average transmittance in a wavelength range of 650 nm-700 nm of the seventh optical lens element 770 including the long-wavelength light absorbing agent is T6570, an average transmittance in a wavelength range of 400 nm-650 nm of the seventh optical lens element 770 including the long-wavelength light absorbing agent is T4065, an average transmittance in red visible light region of the seventh optical lens element 770 including the long-wavelength light absorbing agent is T5870, an average transmittance in green visible light region of the seventh optical lens element 770 including the long-wavelength light absorbing agent is T5058, and an average transmittance in blue visible light region of the seventh optical lens element 770 including the long-wavelength light absorbing agent is T4050, the following conditions can be satisfied: 30%≤T7075; T6570≤50%; 50%≤T4065; 50%≤T5870; 75%≤T5058; and 75%≤T4050.

In the optical image lens assembly of the 7th embodiment, when a maximum thickness of the optical lens elements including the long-wavelength light absorbing agent is TKmax, and a minimum thickness of the optical lens elements including the long-wavelength light absorbing agent is TKmin, the following conditions of the first optical lens element 710 are satisfied: TKmax=0.77 mm, TKmin=0.37 mm, and TKmax/TKmin=2.08; the following conditions of the second optical lens element 720 are satisfied: TKmax=0.49 mm, TKmin=0.37 mm, and TKmax/TKmin=1.32, the following conditions of the third optical lens element 730 are satisfied: TKmax=0.46 mm, TKmin=0.25 mm, and TKmax/TKmin=1.84, the following conditions of the fifth optical lens element 750 are satisfied: TKmax=0.70 mm, TKmin=0.41 mm, and TKmax/TKmin=1.71, the following conditions of the sixth optical lens element 760 are satisfied: TKmax=1.29 mm, TKmin=0.51 mm, and TKmax/TKmin=2.53, and the following conditions of the seventh optical lens element 770 are satisfied: TKmax=2.59 mm, TKmin=0.82 mm, and TKmax/TKmin=3.16.

In the optical image lens assembly of the 7th embodiment, a sum of central thicknesses of the optical lens elements including the long-wavelength light absorbing agent is sumCTa (in the 7th embodiment, the first optical lens element 710, the second optical lens element 720, the third optical lens element 730, the fifth optical lens element 750, the sixth optical lens element 760 and the seventh optical lens element 770 include the long-wavelength light absorbing agent, that is, sumCTa equals to the central thickness CT1 of the first optical lens element 710 plus the central thickness CT2 of the second optical lens element 720 plus the central thickness CT3 of the third optical lens element 730 plus the central thickness CT5 of the fifth optical lens element 750 plus the central thickness CT6 of the sixth optical lens element 760 plus the central thickness CT7 of the seventh optical lens element 770), a sum of central thicknesses of the optical lens elements is sumCT (in the 7th embodiment, sumCT equals to the central thickness CT1 of the first optical lens element 710 plus the central thickness CT2 of the second optical lens element 720 plus the central thickness CT3 of the third optical lens element 730 plus the central thickness CT4 of the fourth optical lens element 740 plus the central thickness CT5 of the fifth optical lens element 750 plus the central thickness CT6 of the sixth optical lens element 760 plus the central thickness CT7 of the seventh optical lens element 770), and a maximum of maximum effective diameters of the optical lens elements including the long-wavelength light absorbing agent is $\phi$ max (in the 7th embodiment, $\phi$ max equals to a maximum effective diameter of the seventh optical lens element 770), the following conditions are satisfied: sumCTa=3.09 mm; sumCT=4.15 mm; $\phi$ max=8.94 mm; sumCTa/sumCT=0.74; and $\phi$ max/sumCTa=2.90.

The details of the plastic material and the long-wavelength light absorbing agent have been mentioned above, and are not repeated herein.

8th Embodiment

Figure 8:
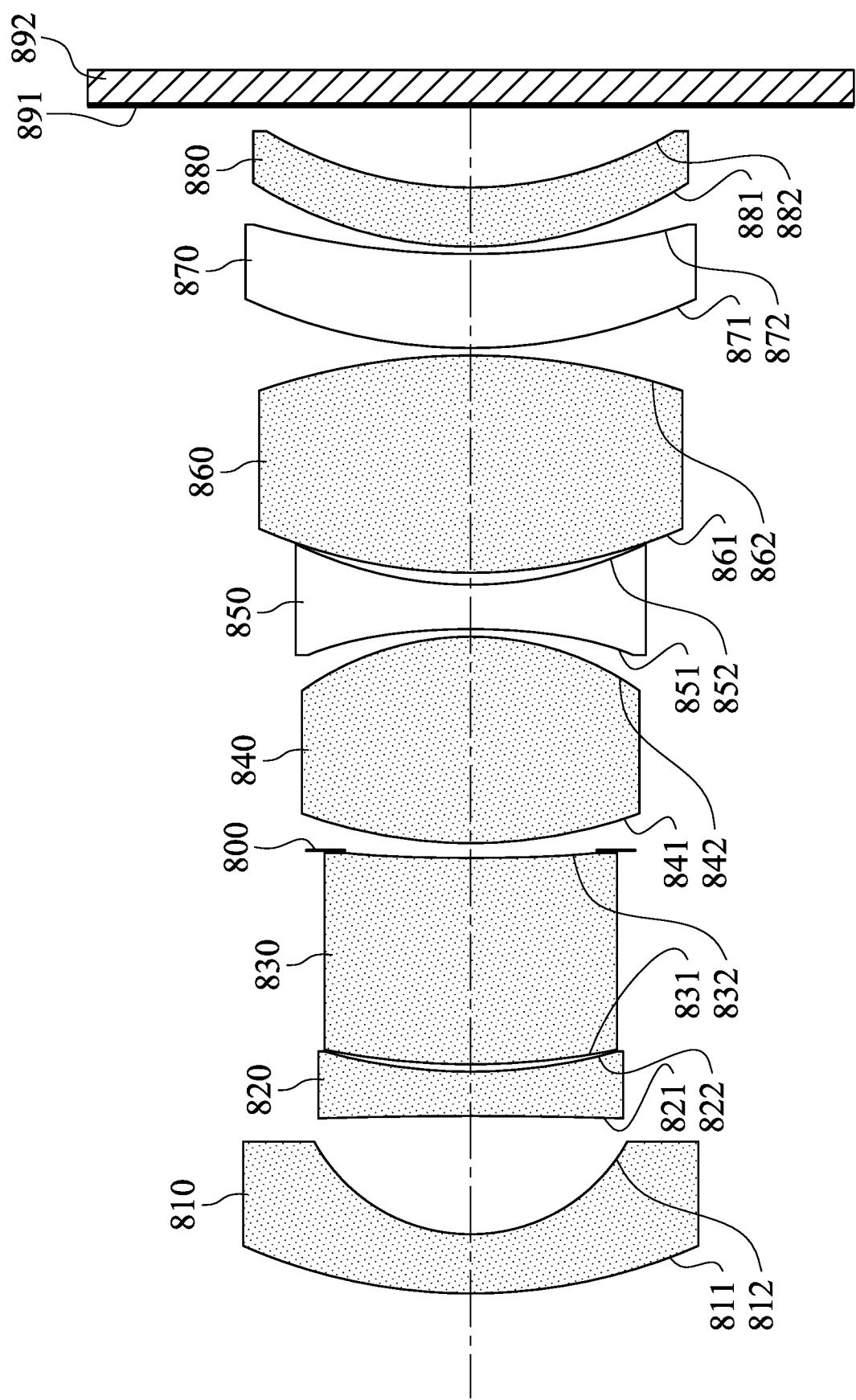
FIG. 8 is a schematic view of an image capturing apparatus according to the 8th embodiment of the present disclosure.

FIG. 8 is a schematic view of an image capturing apparatus according to the 8th embodiment of the present disclosure. In FIG. 8, the image capturing apparatus includes an optical image lens assembly (its reference numeral is omitted) and an image sensor 892. The optical image lens assembly includes, in order from an object side to an image side, a first optical lens element 810, a second optical lens element 820, a third optical lens element 830, an aperture stop 800, a fourth optical lens element 840, a fifth optical lens element 850, a sixth optical lens element 860, a seventh optical lens element 870, an eighth optical lens element 880 and an image surface 891, wherein the image sensor 892 is disposed on the image surface 891 of the optical image lens assembly.

The first optical lens element 810 with negative refractive power has an object-side surface 811 being convex in a paraxial region thereof and an image-side surface 812 being concave in a paraxial region thereof, and has the object-side surface 811 and the image-side surface 812 being both spherical. The first optical lens element 810 is made of a plastic material (its reference numeral is omitted), and includes at least one long-wavelength light absorbing agent (its reference numeral is omitted). The long-wavelength light absorbing agent is homogeneously mixed with the plastic material. When a central thickness of the first optical lens element 810 including the long-wavelength light absorbing agent is CT1, the following condition is satisfied: CT1=0.72 mm. When a wavelength correspondent to a 50% transmittance of the first optical lens element 810 including the long-wavelength light absorbing agent is WLT50, the following condition can be satisfied: 550 nm≤WLT50≤700 nm. When a minimum transmittance in infrared region of the first optical lens element 810 including the long-wavelength light absorbing agent is TIRmin, the following condition can be satisfied: TIRmin≤30%. When an average transmittance in a wavelength range of 700 nm-750 nm of the first optical lens element 810 including the long-wavelength light absorbing agent is T7075, an average transmittance in a wavelength range of 650 nm-700 nm of the first optical lens element 810 including the long-wavelength light absorbing agent is T6570, an average transmittance in a wavelength range of 400 nm-650 nm of the first optical lens element 810 including the long-wavelength light absorbing agent is T4065, an average transmittance in red visible light region of the first optical lens element 810 including the long-wavelength light absorbing agent is T5870, an average transmittance in green visible light region of the first optical lens element 810 including the long-wavelength light absorbing agent is T5058, and an average transmittance in blue visible light region of the first optical lens element 810 including the long-wavelength light absorbing agent is T4050, the following conditions can be satisfied: 30%≤T7075; T6570≤50%; 50%≤T4065; 50%≤T5870; 75%≤T5058; and 75%≤T4050. The second optical lens element 820 with negative refractive power has an object-side surface 821 being concave in a paraxial region thereof and an image-side surface 822 being concave in a paraxial region thereof, and has the object-side surface 821 and the image-side surface 822 being both spherical. The second optical lens element 820 is made of a plastic material (its reference numeral is omitted), and includes at least one long-wavelength light absorbing agent (its reference numeral is omitted). The long-wavelength light absorbing agent is homogeneously mixed with the plastic material. The second optical lens element 820 is the second optical lens element among the optical lens elements in order from an object side to an image side. When a central thickness of the second optical lens element 820 is CT2, the following condition is satisfied: CT2=0.54 mm. When a wavelength correspondent to a 50% transmittance of the second optical lens element 820 including the long-wavelength light absorbing agent is WLT50, the following condition can be satisfied: 550 nm≤WLT50≤700 nm. When a minimum transmittance in infrared region of the second optical lens element 820 including the long-wavelength light absorbing agent is TIRmin, the following condition can be satisfied: TIRmin≤30%. When an average transmittance in a wavelength range of 700 nm-750 nm of the second optical lens element 820 including the long-wavelength light absorbing agent is T7075, an average transmittance in a wavelength range of 650 nm-700 nm of the second optical lens element 820 including the long-wavelength light absorbing agent is T6570, an average transmittance in a wavelength range of 400 nm-650 nm of the second optical lens element 820 including the long-wavelength light absorbing agent is T4065, an average transmittance in red visible light region of the second optical lens element 820 including the long-wavelength light absorbing agent is T5870, an average transmittance in green visible light region of the second optical lens element 820 including the long-wavelength light absorbing agent is T5058, and an average transmittance in blue visible light region of the second optical lens element 820 including the long-wavelength light absorbing agent is T4050, the following conditions can be satisfied: 30%≤T7075; T6570≤50%; 50%≤T4065; 50%≤T5870; 75%≤T5058; and 75%≤T4050.

The third optical lens element 830 with positive refractive power has an object-side surface 831 being convex in a paraxial region thereof and an image-side surface 832 being concave in a paraxial region thereof, and has the object-side surface 831 and the image-side surface 832 being both aspheric. The third optical lens element 830 is made of a plastic material (its reference numeral is omitted), and includes at least one long-wavelength light absorbing agent (its reference numeral is omitted). The long-wavelength light absorbing agent is homogeneously mixed with the plastic material. The third optical lens element 830 is the third optical lens element among the optical lens elements in order from an object side to an image side. When a central thickness of the third optical lens element 830 is CT3, the following condition is satisfied: CT3=2.50 mm. When a wavelength correspondent to a 50% transmittance of the third optical lens element 830 including the long-wavelength light absorbing agent is WLT50, the following condition can be satisfied: 550 nm≤WLT50≤700 nm. When a minimum transmittance in infrared region of the third optical lens element 830 including the long-wavelength light absorbing agent is TIRmin, the following condition can be satisfied: TIRmin≤30%. When an average transmittance in a wavelength range of 700 nm-750 nm of the third optical lens element 830 including the long-wavelength light absorbing agent is T7075, an average transmittance in a wavelength range of 650 nm-700 nm of the third optical lens element 830 including the long-wavelength light absorbing agent is T6570, an average transmittance in a wavelength range of 400 nm-650 nm of the third optical lens element 830 including the long-wavelength light absorbing agent is T4065, an average transmittance in red visible light region of the third optical lens element 830 including the long-wavelength light absorbing agent is T5870, an average transmittance in green visible light region of the third optical lens element 830 including the long-wavelength light absorbing agent is T5058, and an average transmittance in blue visible light region of the third optical lens element 830 including the long-wavelength light absorbing agent is T4050, the following conditions can be satisfied: 30%≤T7075; T6570≤50%; 50%≤T4065; 50%≤T5870; 75%≤T5058; and 75%≤T4050.

The fourth optical lens element 840 with positive refractive power has an object-side surface 841 being convex in a paraxial region thereof and an image-side surface 842 being convex in a paraxial region thereof, and has the object-side surface 841 and the image-side surface 842 being both spherical. The fourth optical lens element 840 is made of a plastic material (its reference numeral is omitted), and includes at least one long-wavelength light absorbing agent (its reference numeral is omitted). The long-wavelength light absorbing agent is homogeneously mixed with the plastic material. When a central thickness of the fourth optical lens element 840 including the long-wavelength light absorbing agent is CT4, the following condition is satisfied: CT4=2.50 mm. When a wavelength correspondent to a 50% transmittance of the fourth optical lens element 840 including the long-wavelength light absorbing agent is WLT50, the following condition can be satisfied: 550 nm≤WLT50≤700 nm. When a minimum transmittance in infrared region of the fourth optical lens element 840 including the long-wavelength light absorbing agent is TIRmin, the following condition can be satisfied: TIRmin≤30%. When an average transmittance in a wavelength range of 700 nm-750 nm of the fourth optical lens element 840 including the long-wavelength light absorbing agent is T7075, an average transmittance in a wavelength range of 650 nm-700 nm of the fourth optical lens element 840 including the long-wavelength light absorbing agent is T6570, an average transmittance in a wavelength range of 400 nm-650 nm of the fourth optical lens element 840 including the long-wavelength light absorbing agent is T4065, an average transmittance in red visible light region of the fourth optical lens element 840 including the long-wavelength light absorbing agent is T5870, an average transmittance in green visible light region of the fourth optical lens element 840 including the long-wavelength light absorbing agent is T5058, and an average transmittance in blue visible light region of the fourth optical lens element 840 including the long-wavelength light absorbing agent is T4050, the following conditions can be satisfied: 30%≤T7075; T6570≤50%; 50%≤T4065; 50%≤T5870; 75%≤T5058; and 75%≤T4050.

The fifth optical lens element 850 with negative refractive power has an object-side surface 851 being concave in a paraxial region thereof and an image-side surface 852 being concave in a paraxial region thereof, and has the object-side surface 851 and the image-side surface 852 being both aspheric. When a central thickness of the fifth optical lens element 850 is CT5, the following condition is satisfied: CT5=0.54 mm.

The sixth optical lens element 860 with positive refractive power has an object-side surface 861 being convex in a paraxial region thereof and an image-side surface 862 being convex in a paraxial region thereof, and has the object-side surface 861 and the image-side surface 862 being both spherical. The sixth optical lens element 860 is made of a plastic material (its reference numeral is omitted), and includes at least one long-wavelength light absorbing agent (its reference numeral is omitted). The long-wavelength light absorbing agent is homogeneously mixed with the plastic material. When a central thickness of the sixth optical lens element 860 including the long-wavelength light absorbing agent is CT6, the following condition is satisfied: CT6=2.64 mm. When a wavelength correspondent to a 50% transmittance of the sixth optical lens element 860 including the long-wavelength light absorbing agent is WLT50, the following condition can be satisfied: 550 nm≤WLT50≤700 nm. When a minimum transmittance in infrared region of the sixth optical lens element 860 including the long-wavelength light absorbing agent is TIRmin, the following condition can be satisfied: TIRmin≤30%. When an average transmittance in a wavelength range of 700 nm-750 nm of the sixth optical lens element 860 including the long-wavelength light absorbing agent is T7075, an average transmittance in a wavelength range of 650 nm-700 nm of the sixth optical lens element 860 including the long-wavelength light absorbing agent is T6570, an average transmittance in a wavelength range of 400 nm-650 nm of the sixth optical lens element 860 including the long-wavelength light absorbing agent is T4065, an average transmittance in red visible light region of the sixth optical lens element 860 including the long-wavelength light absorbing agent is T5870, an average transmittance in green visible light region of the sixth optical lens element 860 including the long-wavelength light absorbing agent is T5058, and an average transmittance in blue visible light region of the sixth optical lens element 860 including the long-wavelength light absorbing agent is T4050, the following conditions can be satisfied: 30%≤T7075; T6570≤50%; 50%≤T4065; 50%≤T5870; 75%≤T5058; and 75%≤T4050.

The seventh optical lens element 870 with positive refractive power has an object-side surface 871 being convex in a paraxial region thereof and an image-side surface 872 being concave in a paraxial region thereof, and has the object-side surface 871 and the image-side surface 872 being both aspheric. When a central thickness of the seventh optical lens element 870 is CT7, the following condition is satisfied: CT7=1.14 mm.

The eighth optical lens element 880 with negative refractive power has an object-side surface 881 being convex in a paraxial region thereof and an image-side surface 882 being concave in a paraxial region thereof, and has the object-side surface 881 and the image-side surface 882 being both spherical. The eighth optical lens element 880 is made of a plastic material (its reference numeral is omitted), and includes at least one long-wavelength light absorbing to agent (its reference numeral is omitted). The long-wavelength light absorbing agent is homogeneously mixed with the plastic material. When a central thickness of the eighth optical lens element 880 including the long-wavelength light absorbing agent is CT8, the following condition is satisfied: CT8=0.72 mm. When a wavelength correspondent to a 50% transmittance of the eighth optical lens element 880 including the long-wavelength light absorbing agent is WLT50, the following condition can be satisfied: 550 nm≤WLT50≤700 nm. When a minimum transmittance in infrared region of the eighth optical lens element 880 including the long-wavelength light absorbing agent is TIRmin, the following condition can be satisfied: TIRmin≤30%. When an average transmittance in a wavelength range of 700 nm-750 nm of the eighth optical lens element 880 including the long-wavelength light absorbing agent is T7075, an average transmittance in a wavelength range of 650 nm-700 nm of the eighth optical lens element 880 including the long-wavelength light absorbing agent is T6570, an average transmittance in a wavelength range of 400 nm-650 nm of the eighth optical lens element 880 including the long-wavelength light absorbing agent is T4065, an average transmittance in red visible light region of the eighth optical lens element 880 including the long-wavelength light absorbing agent is T5870, an average transmittance in green visible light region of the eighth optical lens element 880 including the long-wavelength light absorbing agent is T5058, and an average transmittance in blue visible light region of the eighth optical lens element 880 including the long-wavelength light absorbing agent is T4050, the following conditions can be satisfied: 30%≤T7075; T6570≤50%; 50%≤T4065; 50%≤T5870; 75%≤T5058; and 75%≤T4050.

In the optical image lens assembly of the 8th embodiment, when a maximum thickness of the optical lens elements including the long-wavelength light absorbing agent is TKmax, and a minimum thickness of the optical lens elements including the long-wavelength light absorbing agent is TKmin, the following conditions of the first optical lens element 810 are satisfied: TKmax=1.57 mm, TKmin=0.72 mm, and TKmax/TKmin=2.18; the following conditions of the second optical lens element 820 are satisfied: TKmax=0.81 mm, TKmin=0.54 mm, and TKmax/TKmin=1.50, the following conditions of the third optical lens element 830 are satisfied: TKmax=2.50 mm, TKmin=2.39 mm, and TKmax/TKmin=1.05, the following conditions of the fourth optical lens element 840 are satisfied: TKmax=2.50 mm, TKmin=1.49 mm, and TKmax/TKmin=1.68; the following conditions of the sixth optical lens element 860 are satisfied: TKmax=2.64 mm, TKmin=1.67 mm, and TKmax/TKmin=1.58, and the following conditions of the eighth optical lens element 880 are satisfied: TKmax=0.72 mm, TKmin=0.63 mm, and TKmax/TKmin=1.14.

In the optical image lens assembly of the 8th embodiment, a sum of central thicknesses of the optical lens elements including the long-wavelength light absorbing agent is sumCTa (in the 8th embodiment, the first optical lens element 810, the second optical lens element 820; the third optical lens element 830; the fourth optical lens element 840, the sixth optical lens element 860 and the eighth optical lens element 880 include the long-wavelength light absorbing agent, that is, sumCTa equals to the central thickness CT1 of the first optical lens element 810 plus the central thickness CT2 of the second optical lens element 820 plus the central thickness CT3 of the third optical lens element 830 plus the central thickness CT4 of the fourth optical lens element 840 plus the central thickness CT6 of the sixth optical lens element 860 plus the central thickness CT8 of the eighth optical lens element 880), a sum of central thicknesses of the optical lens elements is sumCT (in the 6th embodiment, sumCT equals to the central thickness CT1 of the first optical lens element 810 plus the central thickness CT2 of the second optical lens element 820 plus the central thickness CT3 of the third optical lens element 830 plus the central thickness CT4 of the fourth optical lens element 840 plus the central thickness CT5 of the fifth optical lens element 850 plus the central thickness CT6 of the sixth optical lens element 860 plus the central thickness CT7 of the seventh optical lens element 870 plus the central thickness CT8 of the eighth optical lens element 880), and a maximum of maximum effective diameters of the optical lens elements including the long-wavelength light absorbing agent is $\phi$ max (in the 8th embodiment, $\phi$ max equals to a maximum effective diameter of the first optical lens element 810), the following conditions are satisfied: sumCTa=9.61; sumCT=11.29 mm; $\phi$ max=5.52 mm; sumCTa/sumCT=0.85; and $\phi$ max/sumCTa=0.57.

The details of the plastic material and the long-wavelength light absorbing agent have been mentioned above, and are not repeated herein.

As shown in the 1st embodiment to the 8th embodiment, the optical image lens assembly can include at least one optical lens element including at least one long-wavelength light absorbing agent, so that the long wavelength lights can be effectively absorbed, and the color distortion can be prevented. Furthermore, when the optical image lens assembly includes a plurality of optical lens elements, the optical image lens assembly can also include a plurality of optical lens elements including the long-wavelength light absorbing agent, and the long-wavelength light absorbing agents of different optical lens elements can be the same or different. Moreover, the position of the optical lens element including the long-wavelength light absorbing agent can be adjusted according to practical demands.

9th Embodiment

Figure 9:
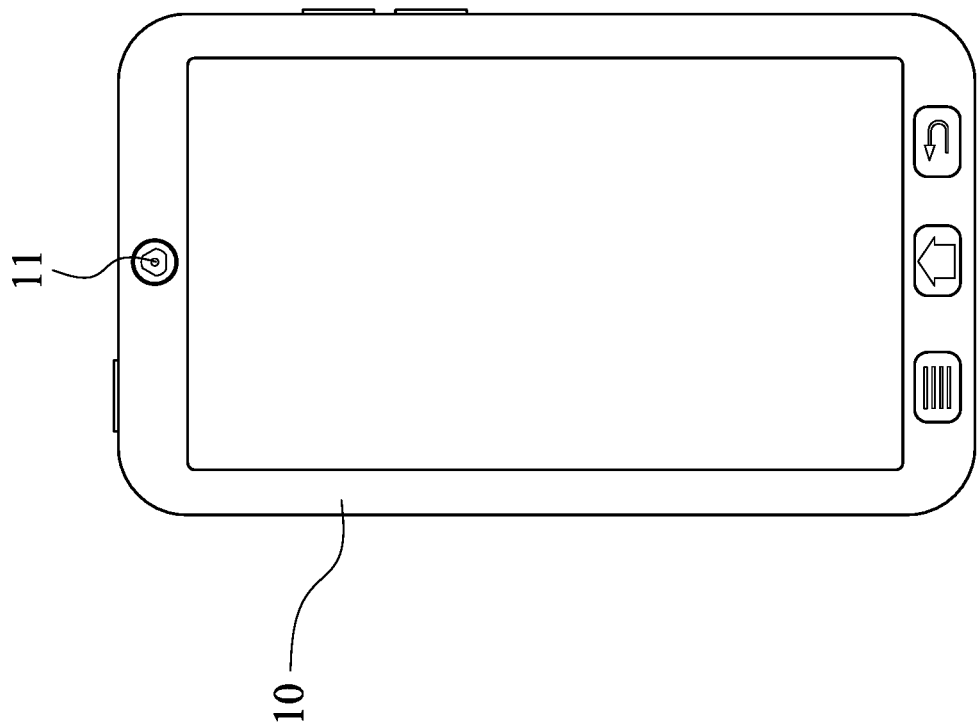
FIG. 9 is a schematic view of an electronic device according to the 9th embodiment of the present disclosure.

FIG. 9 is a schematic view of an electronic device 10 according to the 9th embodiment of the present disclosure. The electronic device 10 of the 9th embodiment is a smart phone, wherein the electronic device 10 includes an image capturing apparatus 11. The image capturing apparatus 11 includes an optical image lens assembly (not shown herein) according to the present disclosure and an image sensor (not shown herein), wherein the image sensor is disposed on an image surface of the optical image lens assembly.

10th Embodiment

Figure 10:
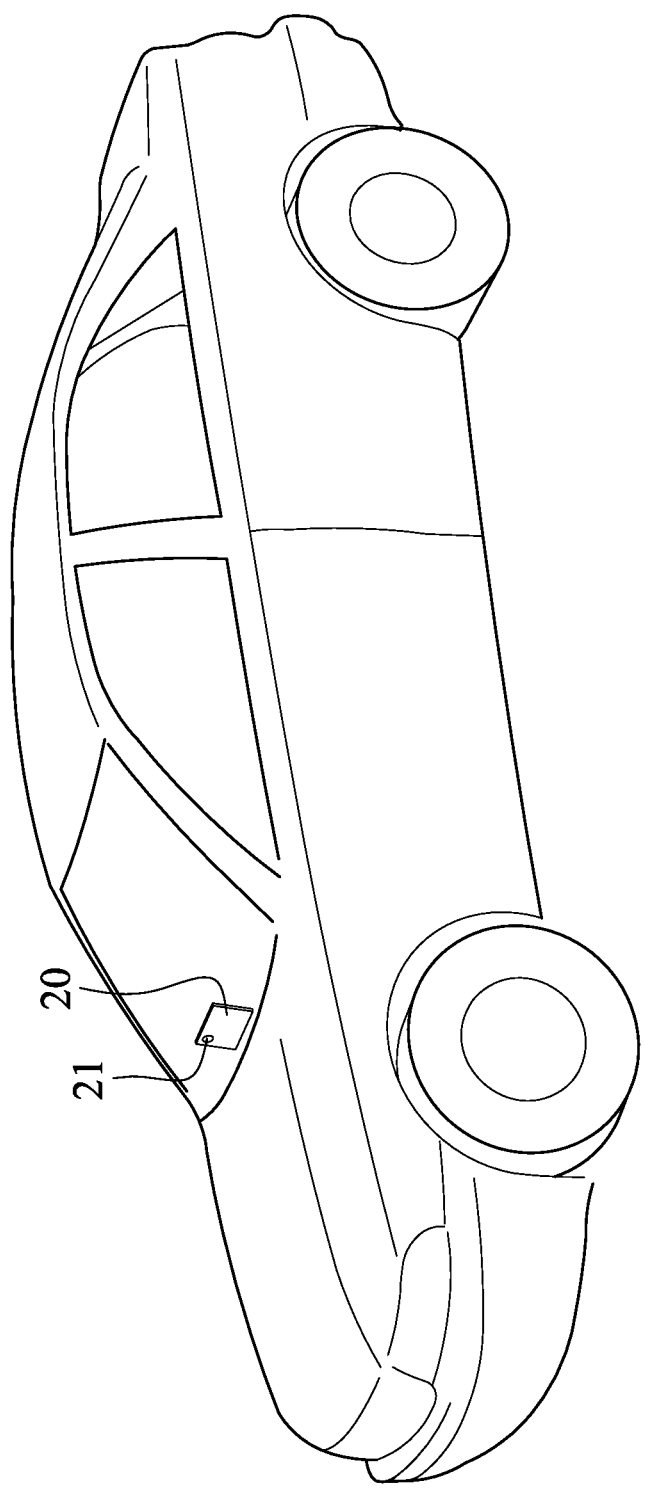
FIG. 10 is a schematic view of an electronic device according to the 10th embodiment of the present disclosure.

FIG. 10 is a schematic view of an electronic device 20 according to the 10th embodiment of the present disclosure. The electronic device 20 of the 10th embodiment is a vehicle photographing system, wherein the electronic device 20 includes an image capturing apparatus 21. The image capturing apparatus 21 includes an optical image lens assembly (not shown herein) according to the present disclosure and an image sensor (not shown herein), wherein the image sensor is disposed on an image surface of the optical image lens assembly.

According to the above description of the present disclosure, the following specific examples are provided for further explanation.

Example 1

Example 1 is an optical lens element including at least one long-wavelength light absorbing agent, and the materials of the optical lens is element are shown in Table 1. Moreover, a central thickness of the optical lens element is 3 mm, and the main ingredient of the optical lens element is PC.

TABLE 1

| | Name |
|---|---|
| long-wavelength light absorbing agent | IRA 705 |
| short-wavelength light absorbing agent | Tinuvin 477 |
| plastic material | PC |

Figure 11:
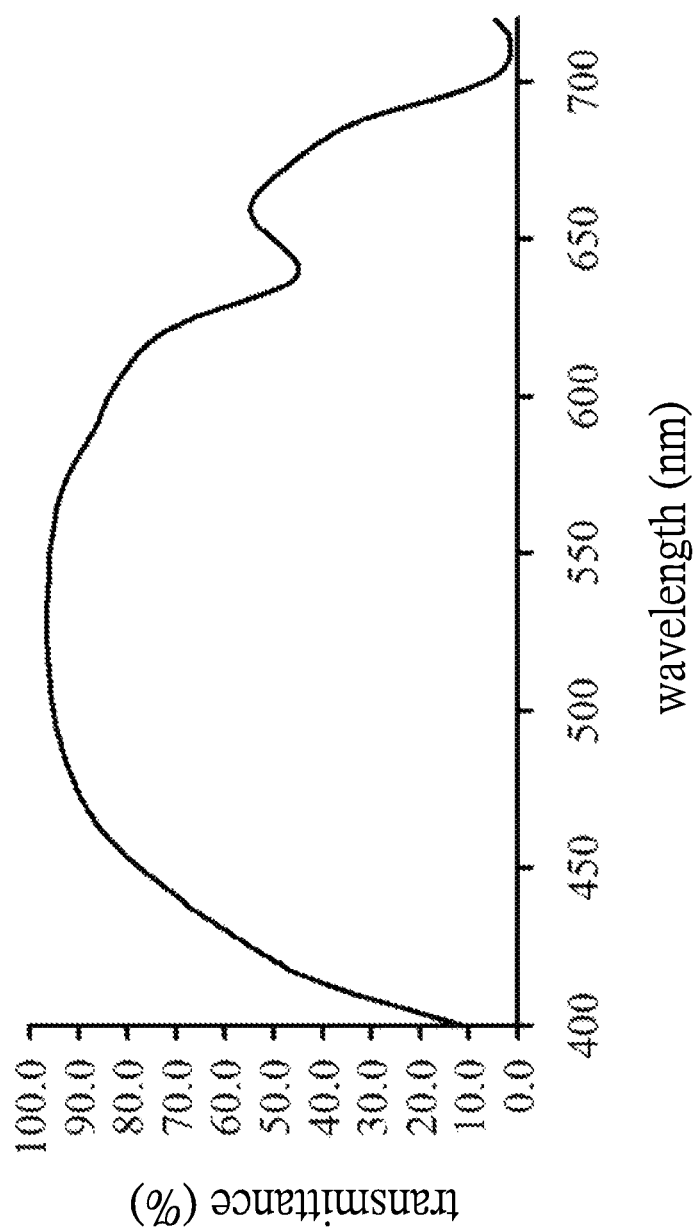
FIG. 11 shows a relationship of transmission and wavelength of Example 1 according to the present disclosure.

In Example 1, a relationship of transmission and wavelength of the optical lens element are measured (with the instrument: Hunterlab Ultrascan Pro). FIG. 11 shows the relationship of transmission and wavelength of Example 1. As shown in FIG. 11, a maximum transmittance in a wavelength range of 450 nm-600 nm of Example 1 is greater than 75%, and a minimum transmittance in a wavelength range of 630 nm-1400 nm of Example 1 is less than 75%.

In Example 1, a wavelength correspondent to a 50% transmittance of the optical lens element including the long-wavelength light absorbing agent is WLT50, and a minimum transmittance in infrared region of the optical lens element including the long-wavelength light absorbing agent is TIRmin. An average transmittance in a wavelength range of 700 nm-750 nm of the optical lens element including the long-wavelength light absorbing agent is T7075. An average transmittance in a wavelength range of 650 nm-700 nm of the optical lens element including the long-wavelength light absorbing agent is T6570. An average transmittance in a wavelength range of 400 nm-650 nm of the optical lens element including the long-wavelength light absorbing agent is T4065. An average transmittance in blue visible light region of the optical lens element including the long-wavelength light absorbing agent is T4050. An average transmittance in green visible light region of the optical lens element including the long-wavelength light absorbing agent is T5058. An average transmittance in red visible light region of the optical lens element including the long-wavelength light absorbing agent is T5870. A wavelength correspondent to a maximum transmittance in a wavelength range of 400 nm-629 nm is WLTmax. A smallest wavelength correspondent to a minimum transmittance in a wavelength range of 630 nm-1400 nm is WLTmin. The values of WLT50, TIRmin, T7075, T6570, T4065, T4050, T5058, T5870, WLTmax and WLTmin are listed in Table 2.

TABLE 2

| WLT50 (nm) | 630 ∓ 5 | T4050 (%) | 68.3 |
|---|---|---|---|
| TIRmin (%) | ≤1.5 | T5058 (%) | 95.4 |
| T7075 (%) | 32.0 | T5870 (%) | 57.7 |
| T6570 (%) | 39.5 | WLTmax (nm) | 530 |
| T4065 (%) | 77.5 | WLTmin (nm) | 710 |

Example 2

Example 2 is an optical lens element including at least one long-wavelength light absorbing agent, and the materials of the optical lens element are shown in Table 3. Moreover, a central thickness of the optical lens element is 3 mm, and the main ingredient of the optical lens element is PC.

TABLE 3

| | name |
|---|---|
| long-wavelength light absorbing agent | Epolight 6084 |
| plastic material | PC |

Figure 12:
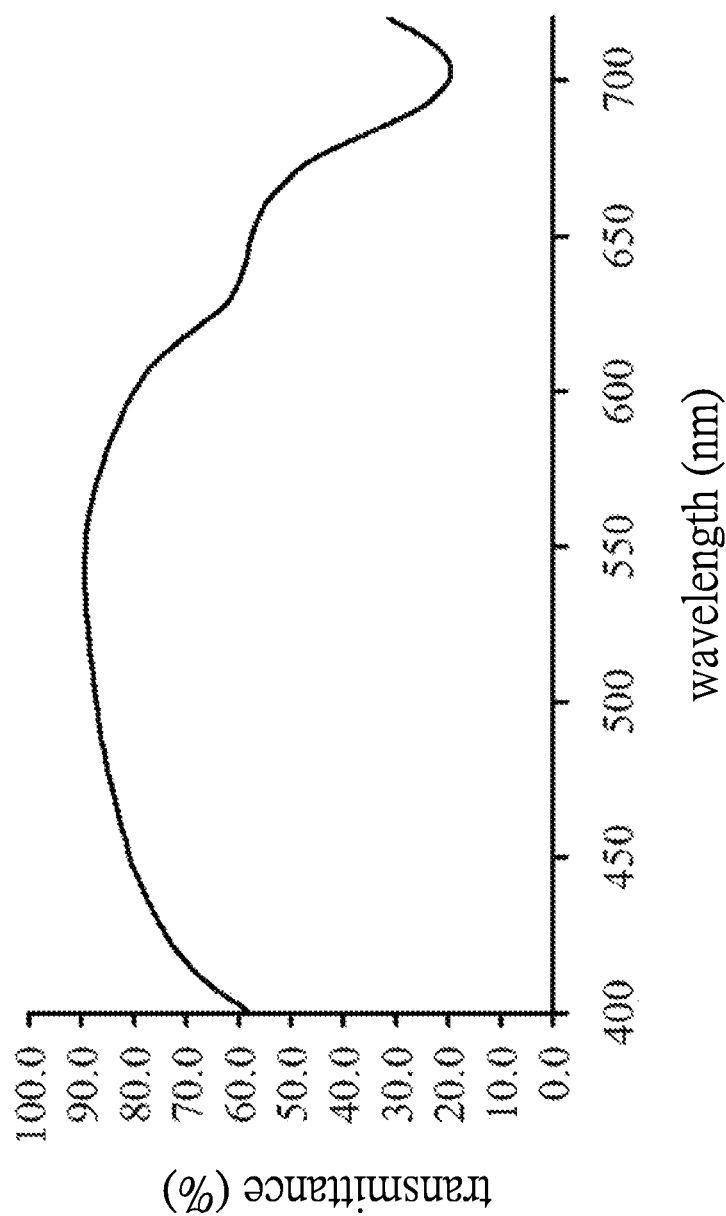
FIG. 12 shows a relationship of transmission and wavelength of Example 2 according to the present disclosure.

In Example 2, a relationship of transmission and wavelength of the optical lens element are measured (with the instrument: Hunterlab Ultrascan Pro). FIG. 12 shows the relationship of transmission and wavelength of Example 2. As shown in FIG. 12, a maximum transmittance in a wavelength range of 450 nm-600 nm of Example 2 is greater than 75%, and a minimum transmittance in a wavelength range of 630 nm-1400 nm of Example 2 is less than 75%.

In Example 2, the values of WLT50, TIRmin, T7075, T6570, T4065, T4050, T5058, T5870, WLTmax and WLTmin are listed in Table 4. The definitions of WLT50, TIRmin, T7075, T6570, T4065, T4050, T5058, T5870, WLTmax and WLTmin are the same as that in Example 1, and are not repeated herein.

TABLE 4

| WLT50 (nm) | 670 ∓ 5 | T4050 (%) | 77.8 |
|---|---|---|---|
| TIRmin (%) | ≤19.7 | T5058 (%) | 88.4 |
| T7075 (%) | 41.0 | T5870 (%) | 58.7 |
| T6570 (%) | 41.5 | WLTmax (nm) | 545 |
| T4065 (%) | 79.2 | WLTmin (nm) | 705 |

Example 3

Example 3 is an optical lens element including at least one long-wavelength light absorbing agent, and the materials of the optical lens element are shown in Table 5. Moreover, a central thickness of the optical lens element is 3 mm, and the main ingredient of the optical lens element is PC.

TABLE 5

| | name |
|---|---|
| long-wavelength light absorbing agent | IRDye 9711 |
| long-wavelength light absorbing agent | IRDye 9740 |
| short-wavelength light absorbing agent | Tinuvin 477 |
| plastic material | PC |

Figure 13:
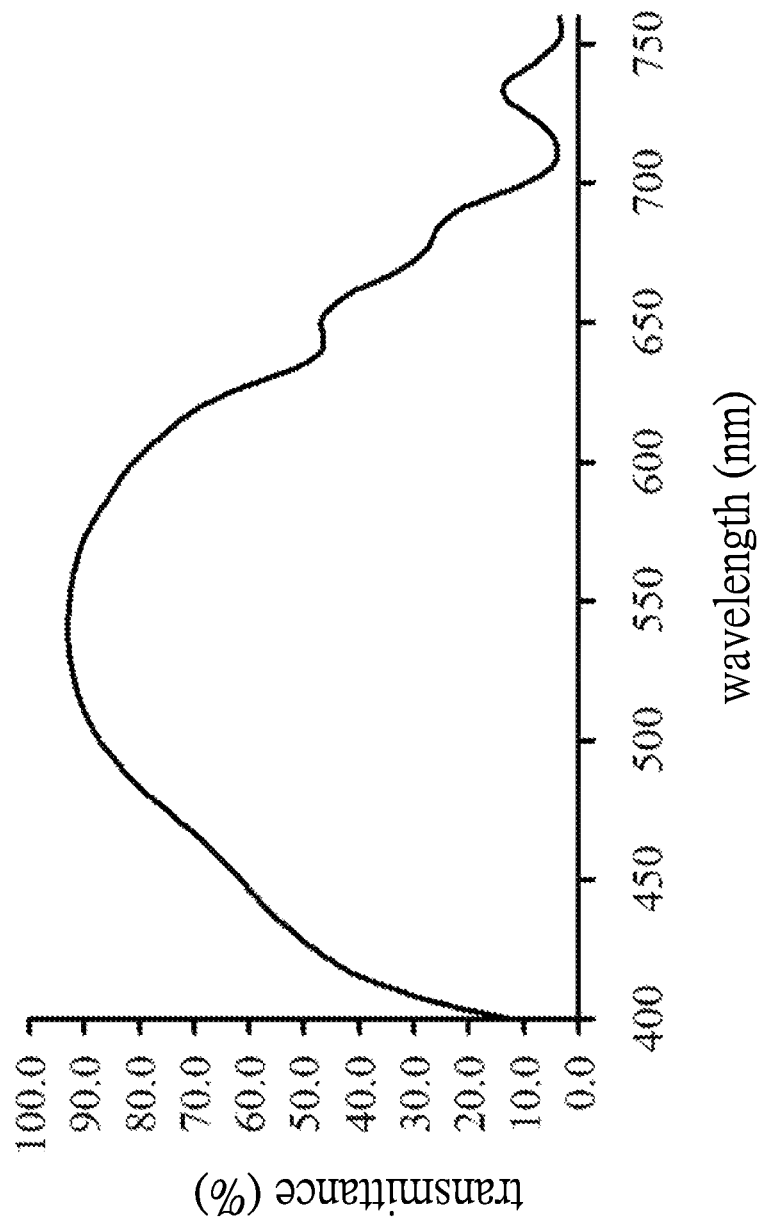
FIG. 13 shows a relationship of transmission and wavelength of Example 3 according to the present disclosure.

In Example 3, a relationship of transmission and wavelength of the optical lens element are measured (with the instrument: Hunterlab Ultrascan Pro). FIG. 13 shows the relationship of transmission and wavelength of Example 3. As shown in FIG. 13, a maximum transmittance in a wavelength range of 450 nm-600 nm of Example 3 is greater than 75%, and a minimum transmittance in a wavelength range of 630 nm-1400 nm of Example 3 is less than 75%.

In Example 3, the values of WLT50, TIRmin, T7075, T6570, T4065, T4050, T5058, T5870, WLTmax and WLTmin are listed in Table 6. The definitions of WLT50, T7075, T6570, T4065, TIRmin, T4050, T5058, T5870, WLTmax and WLTmin are the same as that in Example 1, and are not repeated herein.

TABLE 6

| WLT50 (nm) | 635 ∓ 5 | T4050 (%) | 58.1 |
|---|---|---|---|
| TIRmin (%) | ≤3.1 | T5058 (%) | 91.4 |
| T7075 (%) | 7.7 | T5870 (%) | 52.5 |
| T6570 (%) | 30.0 | WLTmax (nm) | 540 |
| T4065 (%) | 71.6 | WLTmin (nm) | 710, 755 |

Example 4

Example 4 is an optical lens element including at least one long-wavelength light absorbing agent, and the materials of the optical lens element are shown in Table 7. Moreover, a central thickness of the optical lens element is 3 mm, and the main ingredient of the optical lens element is COC/COP.

TABLE 7

| | name |
|---|---|
| long-wavelength light absorbing agent | Epolight 6084 |
| plastic material | COC/COP |

Figure 14:
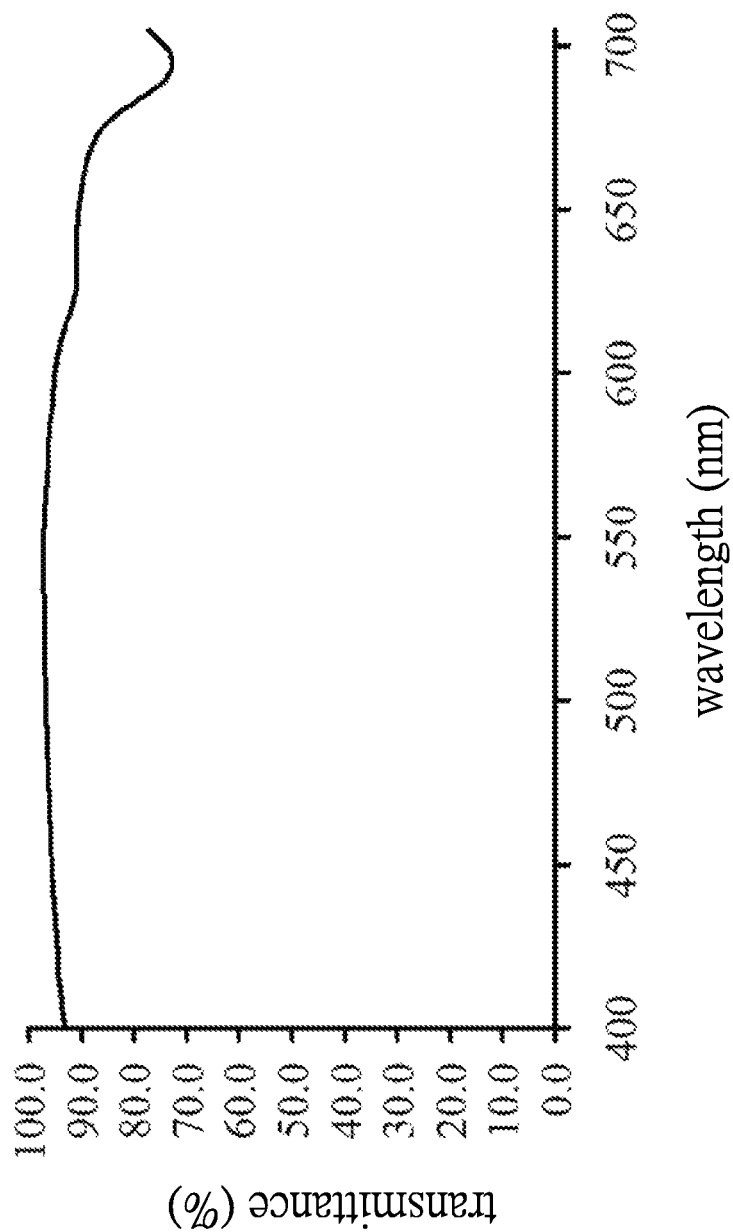
FIG. 14 shows a relationship of transmission and wavelength of Example 4 according to the present disclosure.

In Example 4, a relationship of transmission and wavelength of the optical lens element are measured (with the instrument: Hunterlab Ultrascan Pro). FIG. 14 shows the relationship of transmission and wavelength of Example 4. As shown in FIG. 14, a maximum transmittance in a wavelength range of 450 nm-600 nm of Example 4 is greater than 75%, and a minimum transmittance in a wavelength range of 630 nm-1400 nm of Example 4 is less than 75%.

In Example 4, the values of TIRmin, T7075, T6570, T4065, T4050, T5058, T5870, WLTmax and WLTmin are listed in Table 8. The definitions of TIRmin, T7075, T6570, T4065, T4050, T5058, T5870, WLTmax and WLTmin are the same as that in Example 1, and are not repeated herein.

TABLE 8

| TIRmin (%) | ≤72.8 | T5058 (%) | 96.9 |
|---|---|---|---|
| T7075 (%) | 87.8 | T5870 (%) | 88.8 |
| T6570 (%) | 83.1 | WLTmax (nm) | 545 |
| T4065 (%) | 95.1 | WLTmin (nm) | 695 |
| T4050 (%) | 95.3 | | |

Example 5

Example 5 is an optical lens element including at least one long-wavelength light absorbing agent, and the materials of the optical lens element are shown in Table 9. Moreover, a central thickness of the optical lens element is 3 mm, and the main ingredient of the optical lens element is COC/COP.

TABLE 9

| | name |
|---|---|
| long-wavelength light absorbing agent | phthalocyanine dye |
| plastic material | COC/COP |

Figure 15:
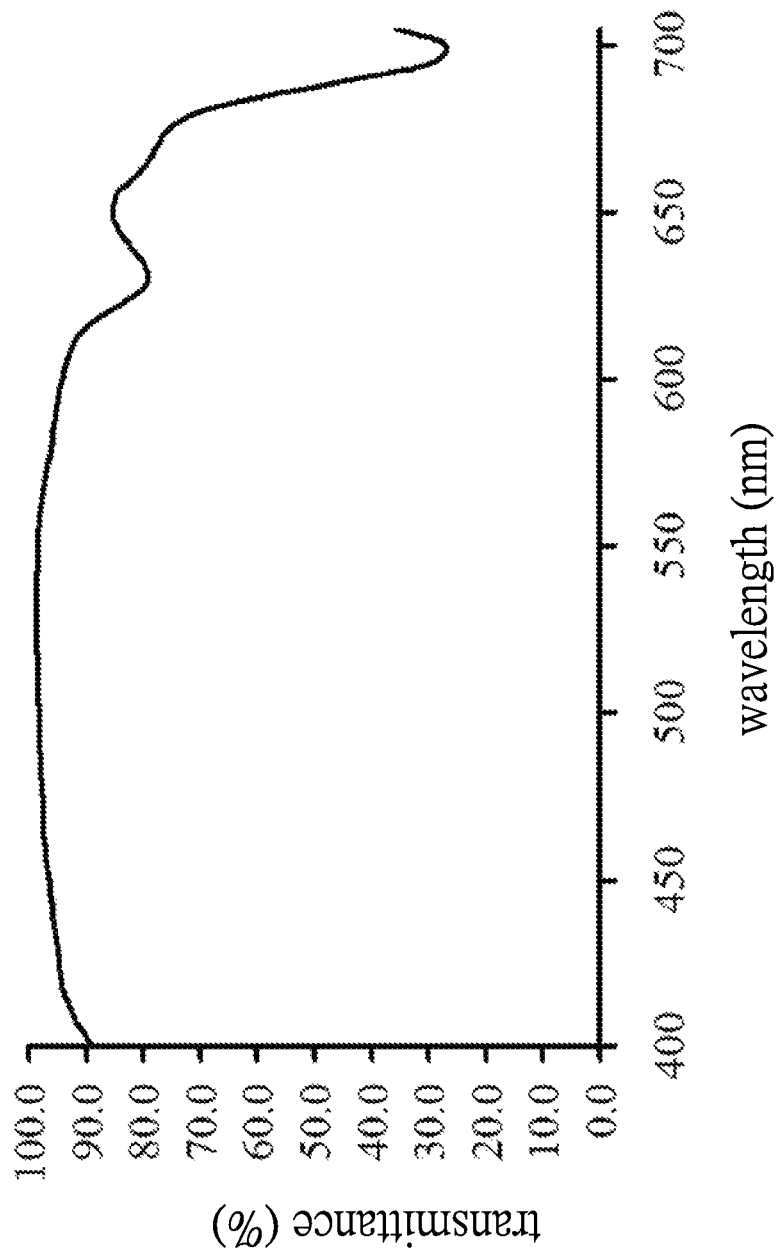
FIG. 15 shows a relationship of transmission and wavelength of Example 5 according to the present disclosure.

In Example 5, a relationship of transmission and wavelength of the optical lens element are measured (with the instrument: Hunterlab Ultrascan Pro). FIG. 15 shows the relationship of transmission and wavelength of Example 5. As shown in FIG. 15, a maximum transmittance in a wavelength range of 450 nm-600 nm of Example 5 is greater than 75%, and a minimum transmittance in a wavelength range of 630 nm-1400 nm of Example 5 is less than 75%.

In Example 5, the values of WLT50, TIRmin, T7075, T6570, T4065, T4050, T5058, T5870, WLTmax and WLTmin are listed in Table 10. The definitions of WLT50, TIRmin, T7075, T6570, T4065, T4050, T5058, T5870, WLTmax and WLTmin are the same as that in Example 1, and are not repeated herein.

TABLE 10

| WLT50 (nm) | 685 ∓ 5 | T4050 (%) | 95.6 |
|---|---|---|---|
| TIRmin (%) | ≤27.0 | T5058 (%) | 98.2 |

TABLE 10-continued

| T7075 (%) | 80.4 | T5870 (%) | 78.3 |
|---|---|---|---|
| T6570 (%) | 64.6 | WLTmax (nm) | 525 |
| T4065 (%) | 94.4 | WLTmin (nm) | 630, 700 |

Example 6

Example 6 is an optical lens element including at least one long-wavelength light absorbing agent, and the materials of the optical lens element are shown in Table 11. Moreover, a central thickness of the optical lens element is 3 mm, and the main ingredient of the optical lens element is to COC/COP.

TABLE 11

| | name |
|---|---|
| long-wavelength light absorbing agent | phthalocyanine dye |
| plastic material | COC/COP |

Figure 16:
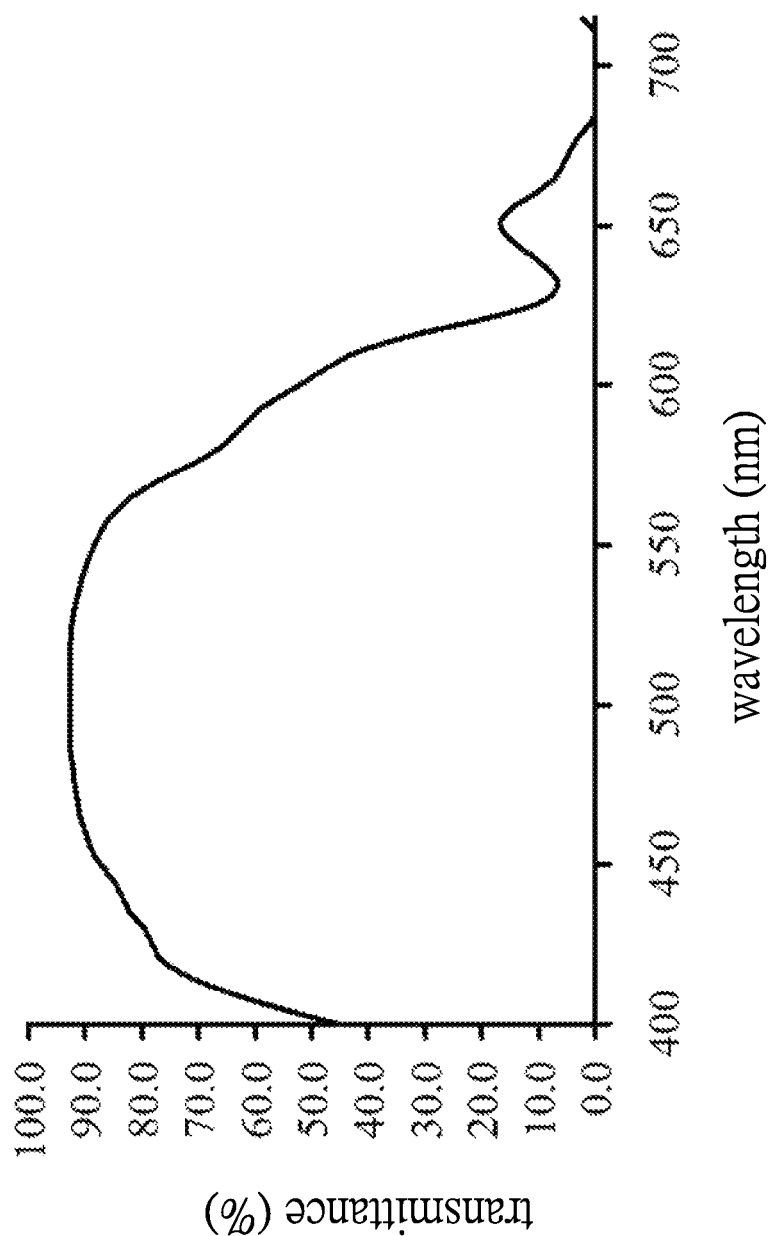
FIG. 16 shows a relationship of transmission and wavelength of Example 6 according to the present disclosure.

In Example 6, a relationship of transmission and wavelength of the optical lens element are measured (with the instrument: Hunterlab Ultrascan Pro). FIG. 16 shows the relationship of transmission and wavelength of Example 6. As shown in FIG. 16, a maximum transmittance in a wavelength range of 450 nm-600 nm of Example 6 is greater than 75%, and a minimum transmittance in a wavelength range of 630 nm-1400 nm of Example 6 is less than 75%.

In Example 6, the values of WLT50, TIRmin, T7075, T6570, T4065, T4050, T5058, T5870, WLTmax, WLTmin and WLT0 are listed in Table 12. The definitions of WLT50, TIRmin, T7075, T6570, T4065, T4050, T5058, T5870, WLTmax and WLTmin are the same as that in Example 1, and are not repeated herein. A wavelength correspondent to a 0% transmittance in a wavelength range which is greater than 580 nm of the optical lens element is WLT0.

TABLE 12

| WLT50 (nm) | 600 ∓ 5 | T5058 (%) | 88.1 |
|---|---|---|---|
| TIRmin (%) | 0 | T5870 (%) | 22.1 |
| T7075 (%) | 30.2 | WLTmax (nm) | 495, 515 |
| T6570 (%) | 5.5 | WLTmin (nm) | 630 |
| T4065 (%) | 69.7 | WLT0 | 685~710 |
| T4050 (%) | 81.8 | | |

Example 7

Example 7 is an optical lens element including at least one long-wavelength light absorbing agent, and the materials of the optical lens element are shown in Table 13. Moreover, a central thickness of the optical lens element is 3 mm, and the main ingredient of the optical lens element is COC/COP.

TABLE 13

| | name |
|---|---|
| long-wavelength light absorbing agent | phthalocyanine dye |
| plastic material | COC/COP |

Figure 17:
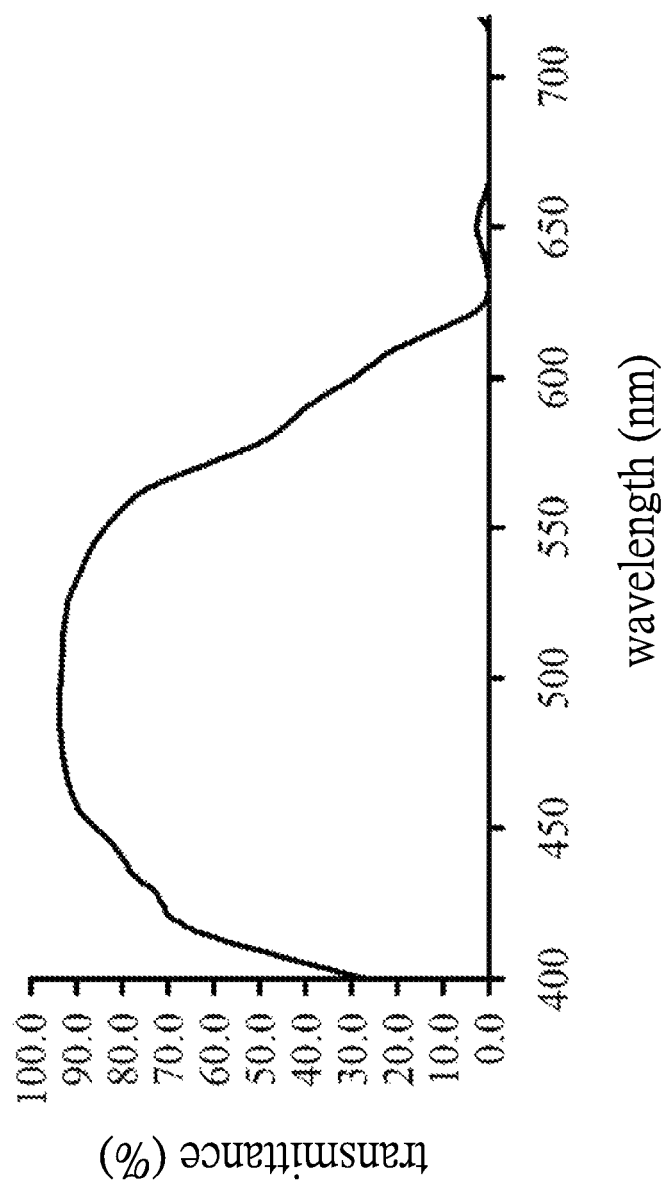
FIG. 17 shows a relationship of transmission and wavelength of Example 7 according to the present disclosure.

In Example 7, a relationship of transmission and wavelength of the optical lens element are measured (with the instrument: Hunterlab Ultrascan Pro). FIG. 17 shows the relationship of transmission and wavelength of Example 7. As shown in FIG. 17, a maximum transmittance in a wavelength range of 450 nm-600 nm of Example 7 is greater than 75%, and a minimum transmittance in a wavelength range of 630 nm-1400 nm of Example 7 is less than 75%.

In Example 7, the values of WLT50, TIRmin, T7075, T6570, T4065, T4050, T5058, T5870, WLTmax, WLTmin and WLT0 are listed in Table 14. The definitions of WLT50, TIRmin, T7075, T6570, T4065, T4050, T5058, T5870, WLTmax and WLTmin are the same as that in Example 1, and are not repeated herein. A wavelength correspondent to a 0% transmittance in a wavelength range which is greater than 580 nm of the optical lens element is WLT0.

TABLE 14

| WLT50 (nm) | 580 ∓ 5 | T5058 (%) | 84.0 |
|---|---|---|---|
| TIRmin (%) | 0 | T5870 (%) | 10.7 |
| T7075 (%) | 28.7 | WLTmax (nm) | 490 |
| T6570 (%) | 0.5 | WLTmin (nm) | 630 |
| T4065 (%) | 61.9 | WLT0 | 665~715 |
| T4050 (%) | 77.4 | | |

Example 8

Example 8 is an optical lens element including at least one long-wavelength light absorbing agent, the materials of the optical lens element are shown in Table 15. Moreover, a central thickness of the optical lens element is 3 mm, and the main ingredient of the optical lens element is COC/COP.

TABLE 15

| | name |
|---|---|
| long-wavelength light absorbing agent | IRA 732 |
| plastic material | COC/COP |

Figure 18:
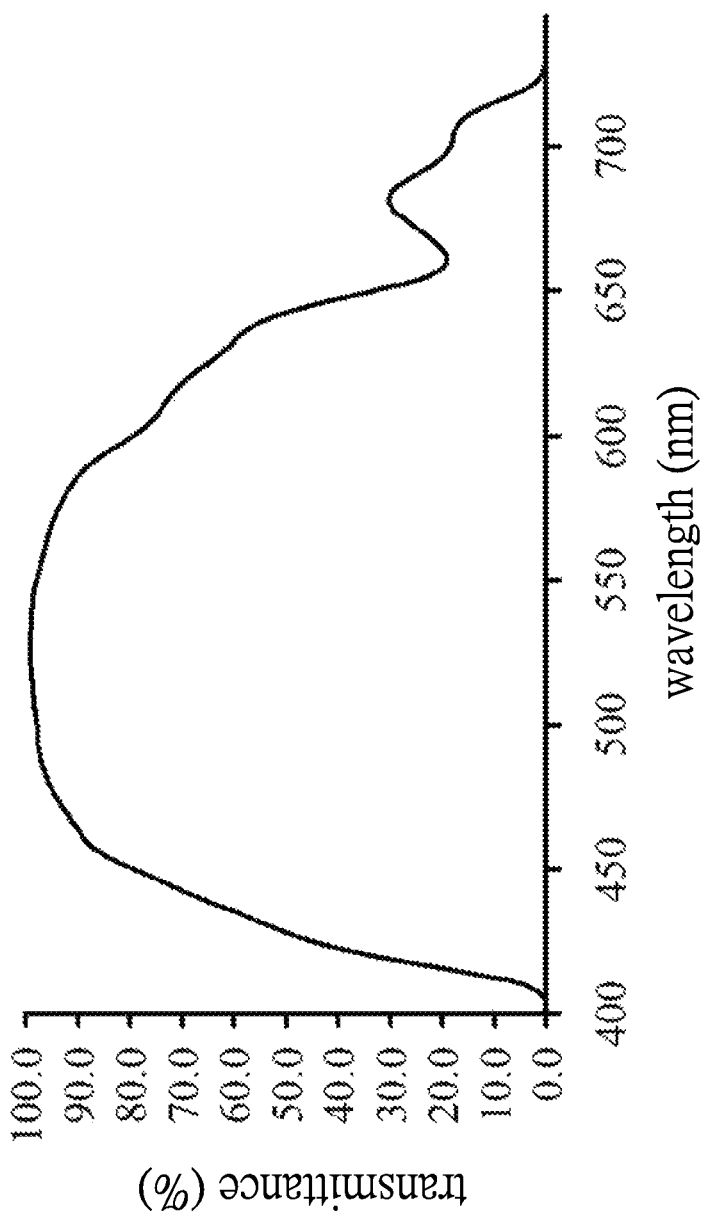
FIG. 18 shows a relationship of transmission and wavelength of Example 8 according to the present disclosure.

In Example 8, a relationship of transmission and wavelength of the optical lens element are measured (with the instrument: Hunterlab Ultrascan Pro). FIG. 18 shows the relationship of transmission and wavelength of Example 8. As shown in FIG. 18, a maximum transmittance in a wavelength range of 450 nm-600 nm of Example 8 is greater than 75%, and a minimum transmittance in a wavelength range of 630 nm-1400 nm of Example 8 is less than 75%.

In Example 8, the values of WLT50, TIRmin, T7075, T6570, T4065, T4050, T5058, T5870, WLTmax, WLTmin and WLT0 are listed in Table 16. The definitions of WLT50, TIRmin, T7075, T6570, T4065, T4050, T5058, T5870, WLTmax and WLTmin are the same as that in Example 1, and are not repeated herein. A wavelength correspondent to a 0% transmittance in a wavelength range which is greater than 580 nm of the optical lens element is WLT0.

TABLE 16

| WLT50 (nm) | 640 ∓ 5 | T5058 (%) | 97.7 |
|---|---|---|---|
| TIRmin (%) | 0 | T5870 (%) | 51.0 |
| T7075 (%) | 4.9 | WLTmax (nm) | 525 |
| T6570 (%) | 24.5 | WLTmin (nm) | 660 |
| T4065 (%) | 76.0 | WLT0 | 730~745 |
| T4050 (%) | 63.7 | | |

Additionally, the aforementioned long-wavelength light absorbing agents can be replaced with the materials shown in Table 17.

TABLE 17

| NO. | 1 | 2 | 3 | 4 | 5 | 6 |
|---|---|---|---|---|---|---|
| refractive index (N) | 1.512 | 1.566 | 1.614 | 1.657 | 1.535 | 1.544 |
| Abbe number (V) | 57.0 | 37.5 | 25.9 | 21.2 | 55.0 | 56.0 |
| transmittance (T, %) | 93 | — | — | — | 92 | 90 |
| haze value (Hz, %) | 0.3 | — | — | — | — | 0.5 |
| glass transition temperature (Tg, ° C.) | 164 | 135 | 145 | 155 | 143 | 145 |
| ingredient | COC/COP | PC | PC | PC | COC/COP | COC/COP |

In the optical image lens assembly according to the present disclosure, the refractive index (N) and the Abbe number (V) is measured with a reference wavelength (d-line) at 587.6 nm, the transmittance (T) is to measure a 3 mm test piece with homogeneous thickness by the ASTM D1003 method, the haze value (Hz) is measured by the ASTM D1003 method, and the glass transition temperature (Tg) is measured the differential scanning calorimetry method (DSC).

Comparative Example 1

Comparative Example 1 is an optical lens element without a long-wavelength light absorbing agent, and the material of the optical lens element is shown in Table 18.

TABLE 18

| | name |
|---|---|
| plastic material | PC |

Figure 19:
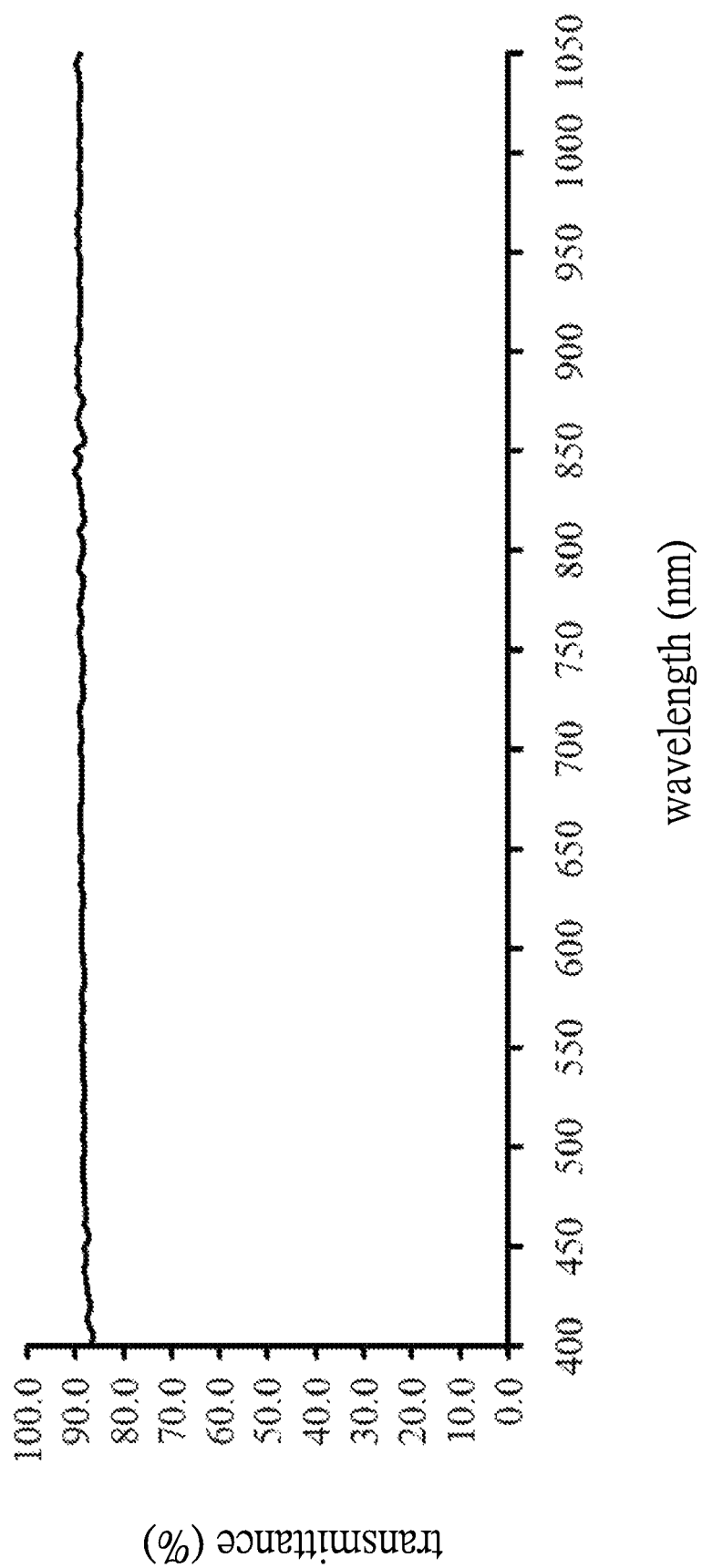
FIG. 19 shows a relationship of transmission and wavelength of Comparative Example 1.

In Comparative Example 1, a relationship of transmission and wavelength of the optical lens element are measured (with the instrument: Hunterlab Ultrascan Pro). FIG. 19 shows the relationship of transmission and wavelength of Comparative Example 1. As shown in FIG. 19, a maximum transmittance in a wavelength range of 450 nm-600 nm of Comparative Example 1 is greater than 75%, and a minimum transmittance in a wavelength range of 630 nm-1050 nm of Comparative Example 1 is also greater than 75%.

In Comparative Example 1, the values of T7075, T6570, T4065, T4050, T5058, T5870 and are listed in Table 19. The definitions of T7075, T6570, T4065, T4050, T5058 and T5870 are the same as that in Example 1, and are not repeated herein.

TABLE 19

| T7075 (%) | 88.7 | T4050 (%) | 87.7 |
|---|---|---|---|
| T6570 (%) | 88.7 | T5058 (%) | 88.3 |
| T4065 (%) | 88.1 | T5870 (%) | 88.6 |

Comparative Example 2

Comparative Example 2 is an optical lens element without a long-wavelength light absorbing agent, and the material of the optical lens element is shown in Table 20.

TABLE 20

| | name |
|---|---|
| plastic material | COC/COP |

Figure 20:
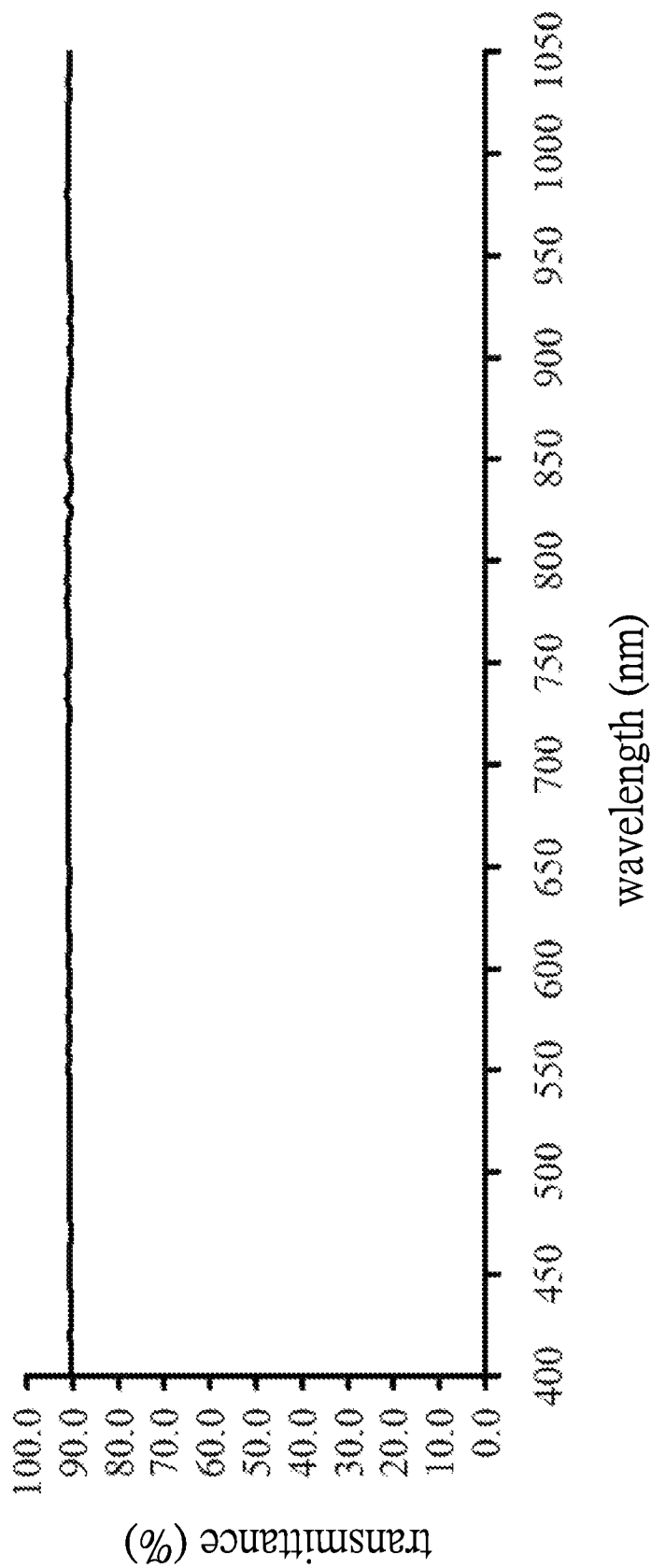
FIG. 20 shows a relationship of transmission and wavelength of Comparative Example 2.

In Comparative Example 2, a relationship of transmission and wavelength of the optical lens element are measured (with the instrument: Hunterlab Ultrascan Pro). FIG. 20 shows the relationship of transmission and wavelength of Comparative Example 2. As shown in FIG. 20, a maximum transmittance in a wavelength range of 450 nm-600 nm of Comparative Example 2 is greater than 75%, and a minimum transmittance in a wavelength range of 630 nm-1050 nm of Comparative Example 2 is also greater than 75%.

In Comparative Example 2, the values of T7075, T6570, T4065, T4050, T5058 and T5870 are listed in Table 21. The definitions of T7075, T6570, T4065, T4050, T5058 and T5870 are the same as that in Example 1, and are not repeated herein.

TABLE 21

| T7075 (%) | 0.9 | T4050 (%) | 90.4 |
|---|---|---|---|
| T6570 (%) | 90.8 | T5058 (%) | 90.7 |
| T4065 (%) | 90.6 | T5870 (%) | 90.8 |

Comparative Example 3

Comparative Example 3 is an optical lens element including at least one long-wavelength light absorbing agent, and the materials of the optical lens element are shown in Table 22. Moreover, a central thickness of the optical lens element is 3 mm, and the main ingredients of the optical lens element is PC.

TABLE 22

| | name |
|---|---|
| long-wavelength light absorbing agent | IRDye 9711 |
| short-wavelength light absorbing agent | Cyasorb UV24 |
| plastic material | PC |

Figure 21:
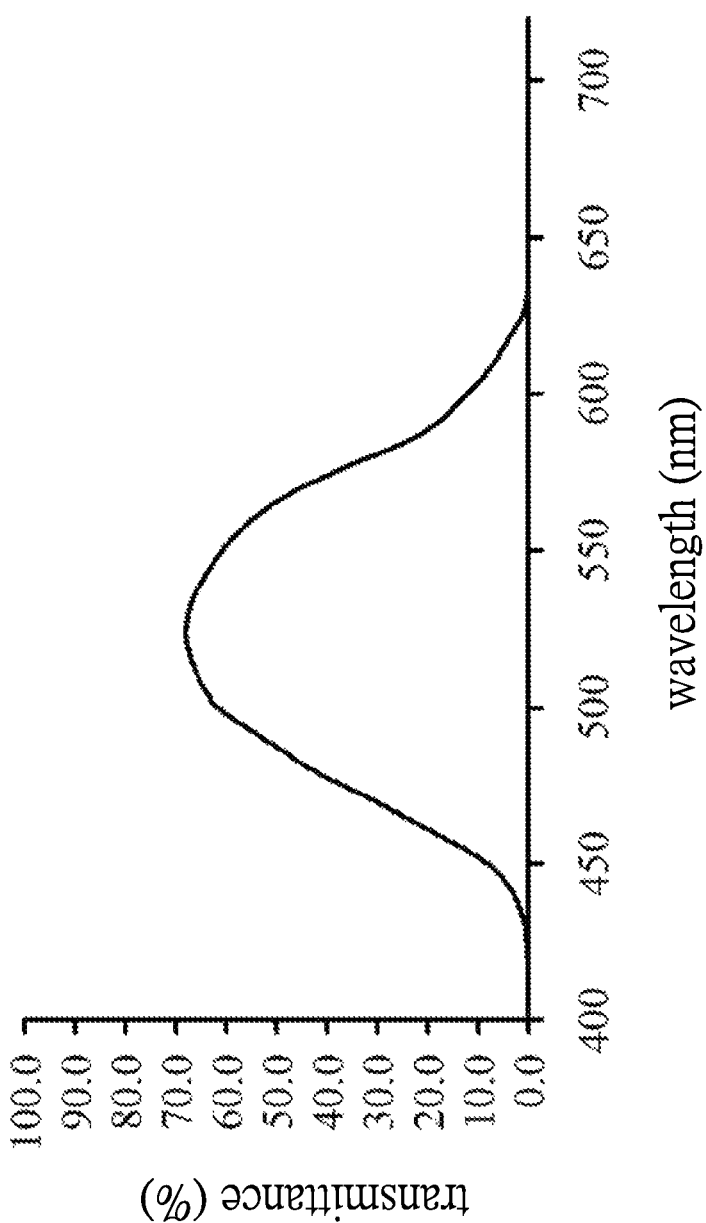
FIG. 21 shows a relationship of transmission and wavelength of Comparative Example 3.

In Comparative Example 3, a relationship of transmission and wavelength of the optical lens element are measured (with the instrument: Hunterlab Ultrascan Pro). FIG. 21 shows the relationship of transmission and wavelength of Comparative Example 3. As shown in FIG. 21, a minimum transmittance in a wavelength range of 630 nm-1400 nm of Comparative Example 3 is less than 75%. However, a maximum transmittance in a wavelength range of 450 nm-600 nm of Comparative Example 3 is also less than 75%, which shows that when the content of the long-wavelength light absorbing agent is excessive, the transmittance in the wavelength range of 450 nm-600 nm will be affected.

In Comparative Example 3, the values of WLT50, TIRmin, T7075, T6570, T4065, T4050, T5058, T5870, WLTmax and WLTmin are listed in Table 23. The definitions of WLT50, TIRmin, T7075, T6570, T4065, T4050, T5058, T5870, WLTmax and WLTmin are the same as that in Example 1, and are not repeated herein.

TABLE 23

| WLT50 (nm) | 565 ∓ 5 | T4050 (%) | 17.3 |
|---|---|---|---|
| TIRmin (%) | 0 | T5058 (%) | 60.3 |
| T7075 (%) | 0.9 | T5870 (%) | 5.0 |
| T6570 (%) | 0.0 | WLTmax (nm) | 525 |
| T4065 (%) | 28.2 | WLTmin (nm) | 640, 725 |

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An optical image lens assembly comprising, in order from an object side to an image side:
   at least six optical lens elements, wherein at least one of the at least six optical lens elements is made of a plastic material comprising at least one long-wavelength light absorbing agent, and the long-wavelength light absorbing agent homogeneously mixed with the plastic material, wherein the optical lens element comprising the long-wavelength light absorbing agent has refractive power, and at least one of an object-side surface and an image-side surface of each of the optical lens elements is aspheric;
   wherein an average transmittance in a wavelength range of 650 nm-700 nm of the optical lens element comprising the long-wavelength light absorbing agent is T6570, an average transmittance in a wavelength range of 400 nm-650 nm of the optical lens element comprising the long-wavelength light absorbing agent is T4065, a maximum thickness of the optical lens element comprising the long-wavelength light absorbing agent is TKmax, a minimum thickness of the optical lens element comprising the long-wavelength light absorbing agent is TKmin, and the following conditions are satisfied:

$T6570 \leq 50\%$;

$61.9\% \leq T4065$; and $1.0 < TKmax/TKmin \leq 2.0$.

2. The optical image lens assembly of claim 1, wherein the plastic material is a thermoplastic material.

3. The optical image lens assembly of claim 2, wherein the plastic material is polycarbonate.

4. The optical image lens assembly of claim 2, wherein a central thickness of the optical lens element comprising the long-wavelength light absorbing agent is CTa, and the following condition is satisfied:

$CTa \leq 1.00$ mm.

5. The optical image lens assembly of claim 2, wherein a glass transition temperature of the optical lens element comprising the long-wavelength light absorbing agent is Tg, and the following condition is satisfied:

$131° C. \leq Tg \leq 165° C.$

6. The optical image lens assembly of claim 2, wherein a transmittance of the optical lens element comprising the long-wavelength light absorbing agent is T, and the following condition is satisfied:

$$90\% \leq T.$$

7. The optical image lens assembly of claim 2, wherein an Abbe number of the optical lens element comprising the long-wavelength light absorbing agent is V, and the following condition is satisfied:

$$15.0 \leq V \leq 37.5.$$

8. The optical image lens assembly of claim 2, wherein a haze value of the optical lens element comprising the long-wavelength light absorbing agent is Hz, and the following condition is satisfied:

$$0.3\% \leq Hz \leq 0.5\%.$$

9. The optical image lens assembly of claim 2, wherein a refractive index of the optical lens element comprising the long-wavelength light absorbing agent is N, and the following condition is satisfied:

$$1.6 \leq N.$$

10. The optical image lens assembly of claim 1, wherein the long-wavelength light absorbing agent is an organic compound.

11. The optical image lens assembly of claim 1, wherein the optical lens element comprising the long-wavelength light absorbing agent is formed by an injection molding method.

12. The optical image lens assembly of claim 1, wherein the average transmittance in the wavelength range of 400 nm-650 nm of the optical lens element comprising the long-wavelength light absorbing agent is T4065, and the following condition is satisfied:

$$75\% \leq T4065.$$

13. The optical image lens assembly of claim 1, wherein the average transmittance in the wavelength range of 650 nm-700 nm of the optical lens element comprising the long-wavelength light absorbing agent is T6570, and the following condition is satisfied:

$$T6570 \leq 30\%.$$

14. The optical image lens assembly of claim 1, wherein an average transmittance in a wavelength range of 700 nm-750 nm of the optical lens element comprising the long-wavelength light absorbing agent is T7075, and the following condition is satisfied:

$$30\% \leq T7075.$$

15. The optical image lens assembly of claim 1, wherein at least one of the object-side surface and the image-side surface of the optical lens element comprising the long-wavelength light absorbing agent comprises a coating with a capability to absorb a light in a wavelength more than 700 nm, and an average transmittance in a wavelength range of 700 nm-750 nm of the optical lens element comprising the long-wavelength light absorbing agent is T7075, and the following condition is satisfied:

$$T7075 \leq 35\%.$$

16. The optical image lens assembly of claim 1, wherein the maximum thickness of the optical lens element comprising the long-wavelength light absorbing agent is TKmax, the minimum thickness of the optical lens element comprising the long-wavelength light absorbing agent is TKmin, and the following condition is satisfied:

$$1.0 < TKmax/TKmin \leq 1.84.$$

17. The optical image lens assembly of claim 16, wherein a sum of a central thickness of the at least one optical lens element comprising the long-wavelength light absorbing agent is sumCTa, a sum of a central thickness of the at least six optical lens elements is sumCT, and the following condition is satisfied:

$$sumCTa/sumCT \leq 1.$$

18. The optical image lens assembly of claim 16, wherein a number of the optical lens elements of the optical image lens assembly is greater than or equals to seven.

19. The optical image lens assembly of claim 16, wherein an average transmittance in a wavelength range of 580 nm-700 nm of the optical lens element comprising the long-wavelength light absorbing agent is T5870, and the following condition is satisfied:

$$22.1\% \leq T5870 \leq 88.8\%.$$

20. The optical image lens assembly of claim 16, wherein the optical image lens assembly comprises a plurality of the optical lens elements, and the optical lens element comprising the long-wavelength light absorbing agent is a second optical lens element or a third optical lens element among the optical lens elements in order from an object side to an image side.

21. The optical image lens assembly of claim 16, wherein a maximum of a maximum effective diameter of the optical lens element comprising the long-wavelength light absorbing agent is $\Phi$max, and the following condition is satisfied:

$$0.50 \text{ mm} \leq \Phi max \leq 60.00 \text{ mm}.$$

22. The optical image lens assembly of claim 16, wherein a maximum of a maximum effective diameter of the optical lens element comprising the long-wavelength light absorbing agent is $\Phi$max, a sum of a central thickness of the at least one optical lens element comprising the long-wavelength light absorbing agent is sumCTa, and the following condition is satisfied:

$$0.10 \leq \Phi max/sumCTa.$$

23. An image capturing apparatus, comprising:
the optical image lens assembly of claim 16; and
an image sensor disposed on an image surface of the optical image lens assembly.

24. An electronic device, which is a mobile photographing device, comprising:
the image capturing apparatus of claim 23.

25. An electronic device, which is a portable device, comprising:
the image capturing apparatus of claim 23.

26. A plastic material for manufacturing the optical lens elements of the optical image lens assembly of claim 1, wherein an average transmittance in a wavelength range of 400 nm-500 nm of the optical lens elements made of the plastic material is T4050, an average transmittance in a wavelength range of 500 nm-580 nm of the optical lens elements made of the plastic material is T5058, an average transmittance in a wavelength range of 580 nm-700 nm of the optical lens elements made of the plastic material is T5870, and the following conditions are satisfied:

$$50\% \leq T4050;$$

$$50\% \leq T5058; \text{ and}$$

$$10\% \leq T5870.$$

* * * * *